US010127579B2

(12) United States Patent
Glover et al.

(10) Patent No.: US 10,127,579 B2
(45) Date of Patent: Nov. 13, 2018

(54) PERSONALIZING ADVERTISEMENTS BASED ON PROXIMATE COMPUTING DEVICES

(71) Applicant: Samsung Electronics Co., Ltd., Suwon-si, Gyeonggi-do (KR)

(72) Inventors: Eric Glover, Palo Alto, CA (US); Eric Chen, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/982,120

(22) Filed: Dec. 29, 2015

(65) Prior Publication Data

US 2016/0358216 A1 Dec. 8, 2016

Related U.S. Application Data

(60) Provisional application No. 62/170,044, filed on Jun. 2, 2015.

(51) Int. Cl.
| | |
|---|---|
| G06Q 30/00 | (2012.01) |
| G06Q 30/02 | (2012.01) |
| G06F 17/30 | (2006.01) |
| H04W 64/00 | (2009.01) |
| H04W 4/02 | (2018.01) |
| H04W 4/70 | (2018.01) |
| H04W 4/80 | (2018.01) |
| H04W 84/12 | (2009.01) |

(52) U.S. Cl.
CPC ..... *G06Q 30/0261* (2013.01); *G06F 17/3087* (2013.01); *G06Q 30/0267* (2013.01); *G06Q 30/0271* (2013.01); *H04W 4/023* (2013.01); *H04W 4/70* (2018.02); *H04W 4/80* (2018.02); *H04W 64/00* (2013.01); *H04W 84/12* (2013.01)

(58) Field of Classification Search
CPC .......... G06Q 30/0261; G06Q 30/0267; G06Q 30/0271; H04W 4/80; H04W 4/70; H04W 4/023; H04W 64/00; H04W 84/12; G06F 17/3087
USPC ..................... 705/14.49, 14.58, 14.64, 14.67
See application file for complete search history.

(56) References Cited

U.S. PATENT DOCUMENTS 8,473,349 B1 * 6/2013 Manber ................. G06Q 30/02
 705/14.48
2006/0041474 A1 2/2006 Westling et al.
(Continued)

*Primary Examiner* — Luis A Brown
(74) *Attorney, Agent, or Firm* — Jefferson IP Law, LLP

(57) ABSTRACT

Techniques include generating an advertisement (ad) including text and/or image data using a user device (e.g., a mobile computing device). The techniques further include identifying one or more proximate devices (e.g., networked computing devices or appliances) located proximate to the user device using a local wireless network (e.g., Wi-Fi, Bluetooth, or NFC). The techniques include modifying (e.g., personalizing) the ad based on the identified proximate devices, based on one or more device types (e.g., categories) associated with the devices, and/or based on one or more states of the devices. In some examples, the techniques include transmitting an indication of the identified proximate devices, their types, and/or their states and an indication of the ad to an ad system, and receiving the modified ad from the system. The techniques also include displaying the modified ad to a user at the user device (e.g., within a software application executing on the device).

20 Claims, 7 Drawing Sheets

(56) References Cited

U.S. PATENT DOCUMENTS

| | | | |
|---|---|---|---|
| 2007/0022442 A1* | 1/2007 | Gil | G06F 17/30905 725/62 |
| 2007/0073585 A1* | 3/2007 | Apple | G06O 30/02 705/14.46 |
| 2010/0121710 A1* | 5/2010 | Chipman | G06Q 30/02 705/14.51 |
| 2011/0010245 A1* | 1/2011 | Priebatsch | G06Q 30/02 705/14.58 |
| 2014/0058793 A1* | 2/2014 | Nath | G06Q 30/08 705/7.31 |
| 2014/0108417 A1* | 4/2014 | Chakrabarti | G06F 17/30864 707/741 |
| 2014/0250106 A1* | 9/2014 | Shapira | G06F 17/30864 707/722 |
| 2014/0373040 A1* | 12/2014 | Lin | H04N 21/4126 725/25 |
| 2015/0006719 A1* | 1/2015 | Gupta | H04L 67/16 709/224 |
| 2015/0019342 A1* | 1/2015 | Gupta | G06Q 30/0269 705/14.66 |
| 2015/0019714 A1* | 1/2015 | Shaashua | H04W 4/70 709/224 |
| 2015/0046255 A1* | 2/2015 | McAteer | G06Q 30/02 705/14.49 |
| 2015/0081904 A1* | 3/2015 | Guedalia | H04L 41/28 709/225 |
| 2015/0154631 A1* | 6/2015 | Umeda | G06Q 30/0243 705/14.42 |
| 2015/0156266 A1* | 6/2015 | Gupta | H04W 4/70 709/224 |
| 2015/0201035 A1* | 7/2015 | Profit | H04L 67/2842 709/213 |
| 2015/0206179 A1* | 7/2015 | Tulloch | G06Q 30/0247 705/14.46 |
| 2015/0358777 A1* | 12/2015 | Gupta | H04L 12/2807 370/254 |
| 2016/0007288 A1* | 1/2016 | Samardzija | H04W 52/0229 370/311 |
| 2016/0013980 A1* | 1/2016 | McKnight | H04L 41/0813 709/221 |
| 2016/0092936 A1* | 3/2016 | Bharath | G06Q 30/0276 705/14.66 |
| 2016/0174266 A1* | 6/2016 | Goel | H04W 4/70 455/509 |
| 2016/0179962 A1* | 6/2016 | Patten | G06F 17/3053 707/706 |
| 2016/0197798 A1* | 7/2016 | Britt | H04W 4/70 370/254 |
| 2016/0205003 A1* | 7/2016 | Srinivasan | H04L 67/10 709/224 |
| 2016/0285979 A1* | 9/2016 | Wang | H04L 67/16 |
| 2016/0357764 A1 | 12/2016 | Glover et al. | |
| 2016/0358215 A1 | 12/2016 | Glover | |
| 2016/0364759 A1 | 12/2016 | Glover | |

\* cited by examiner

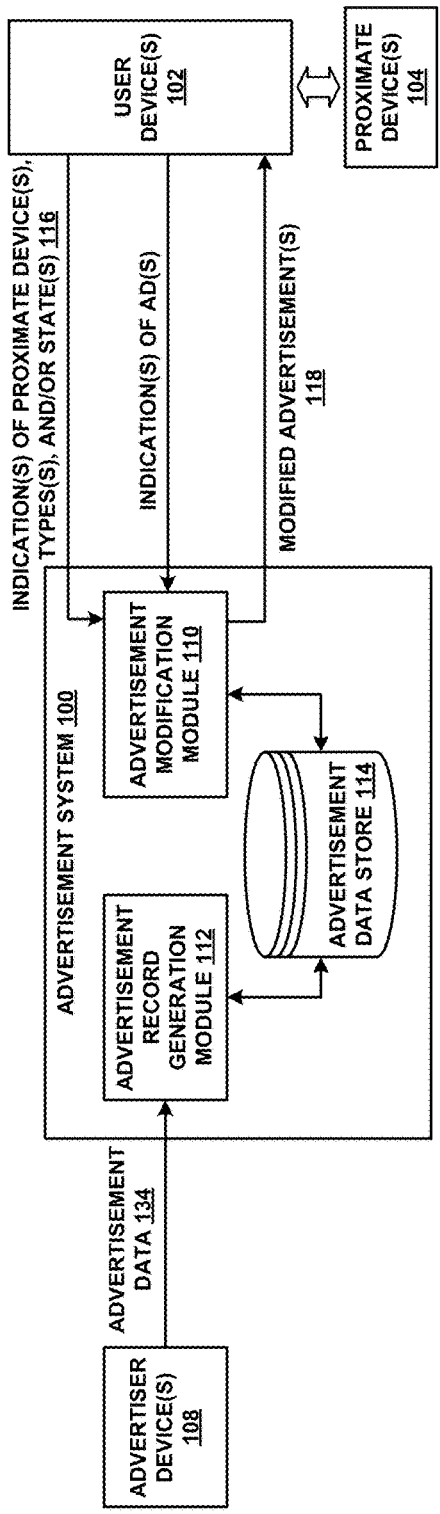
FIG. 3A
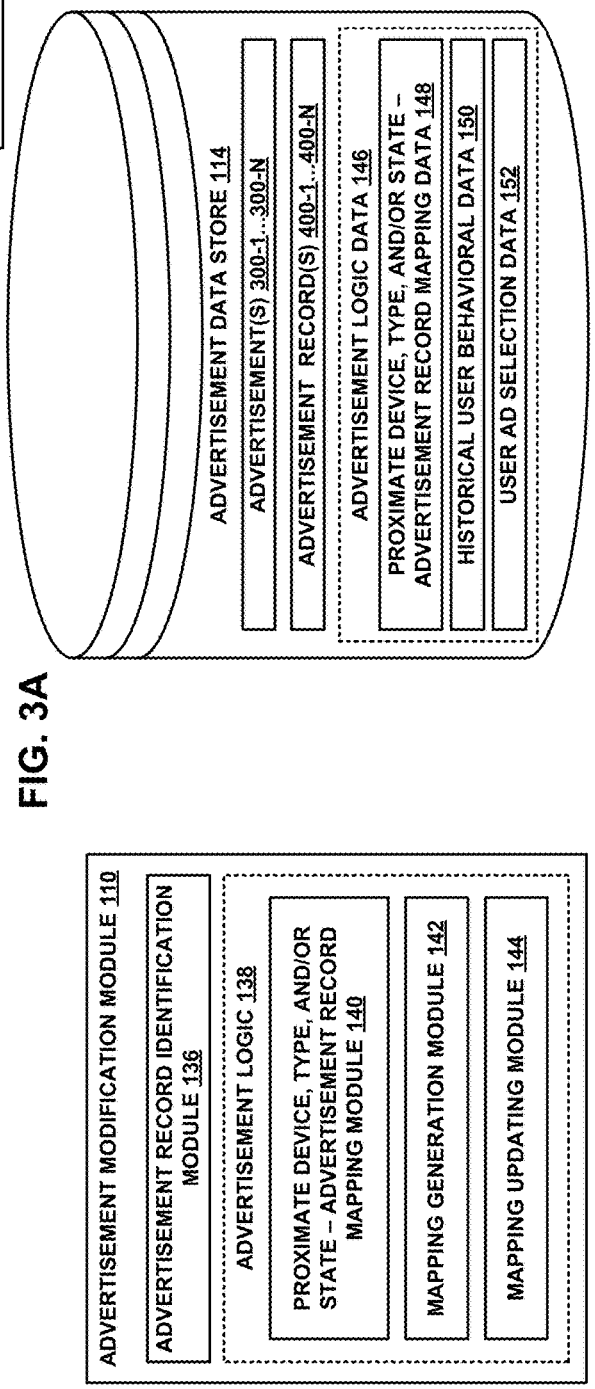
FIG. 3B
FIG. 3C

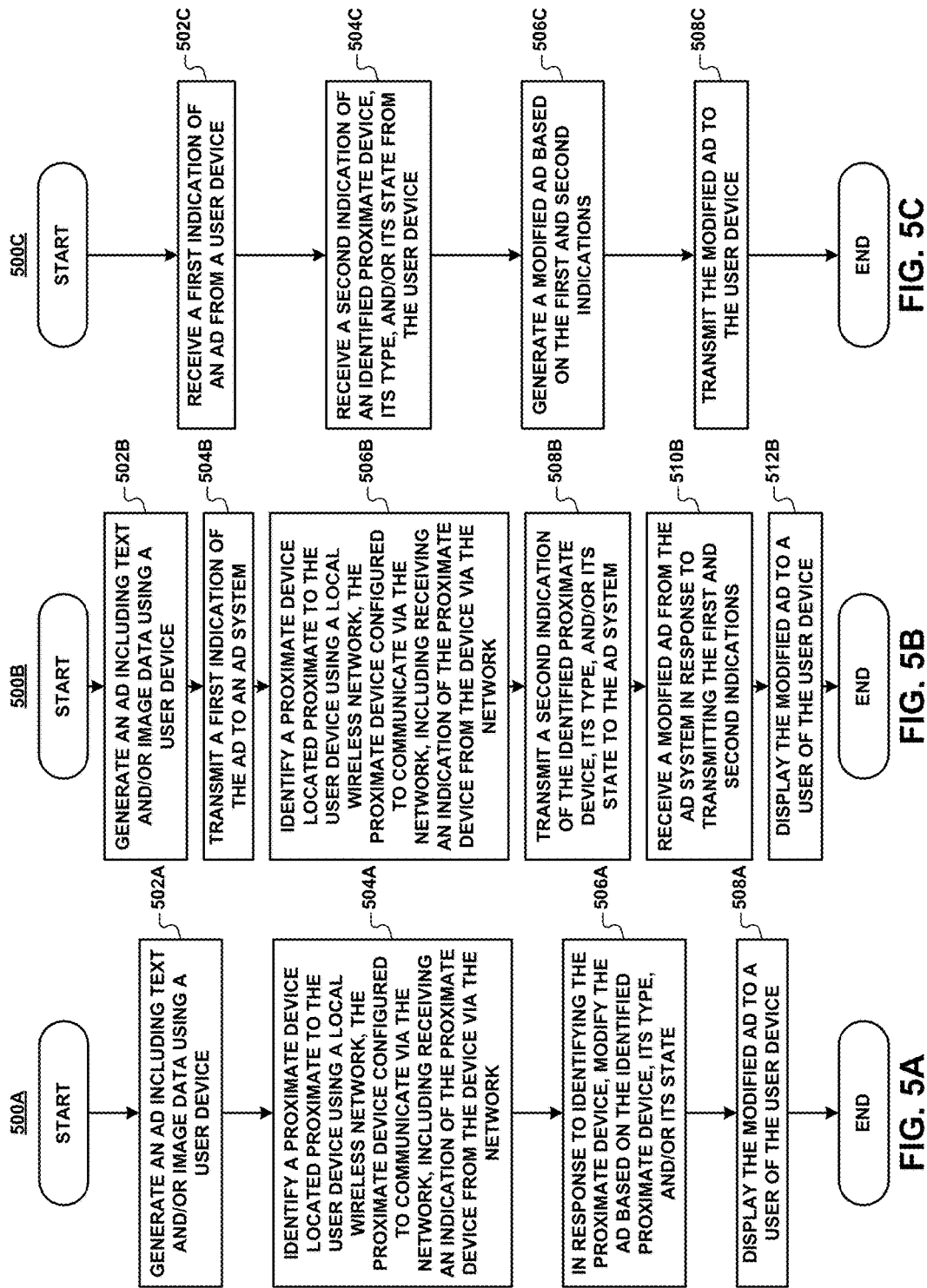

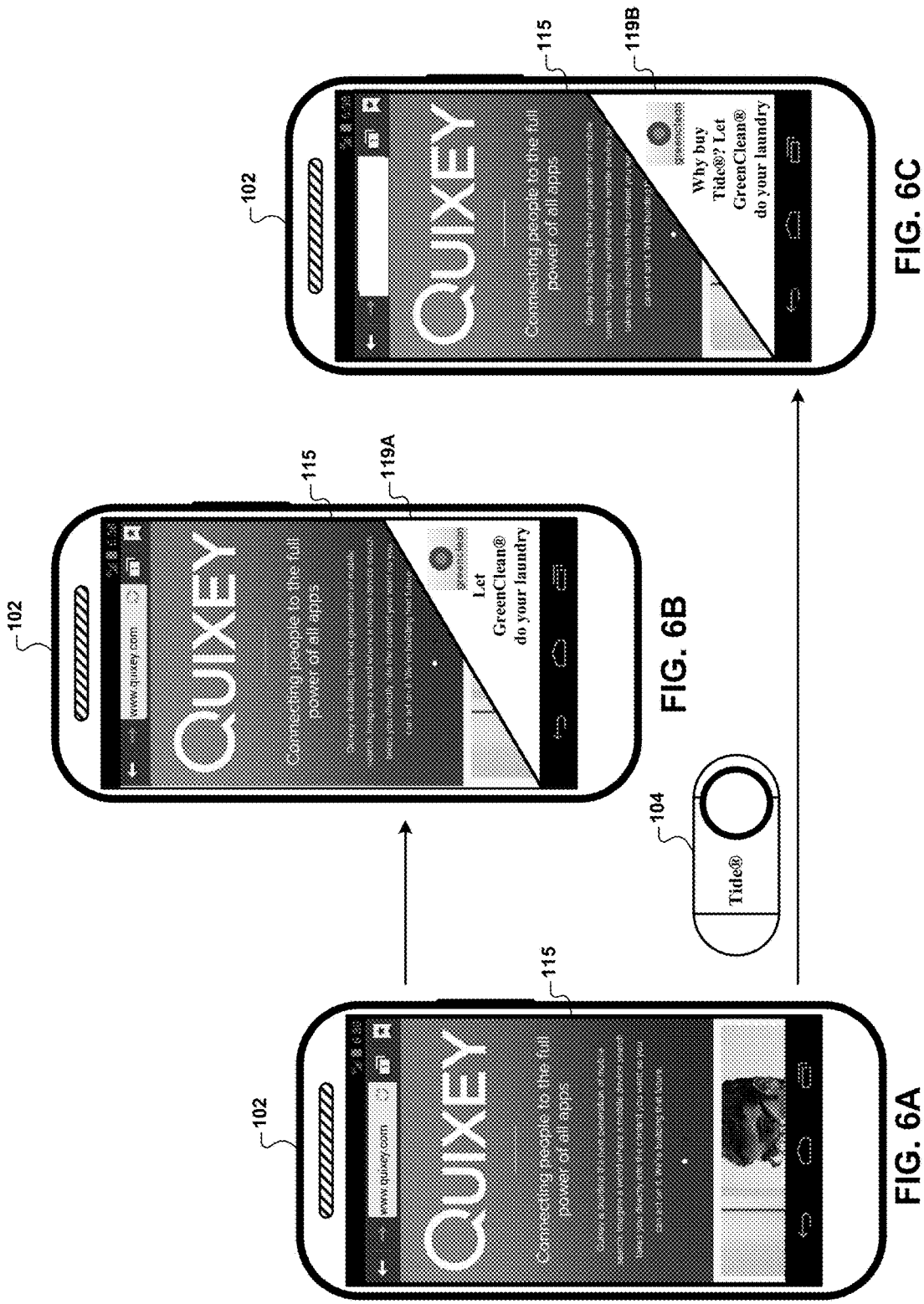

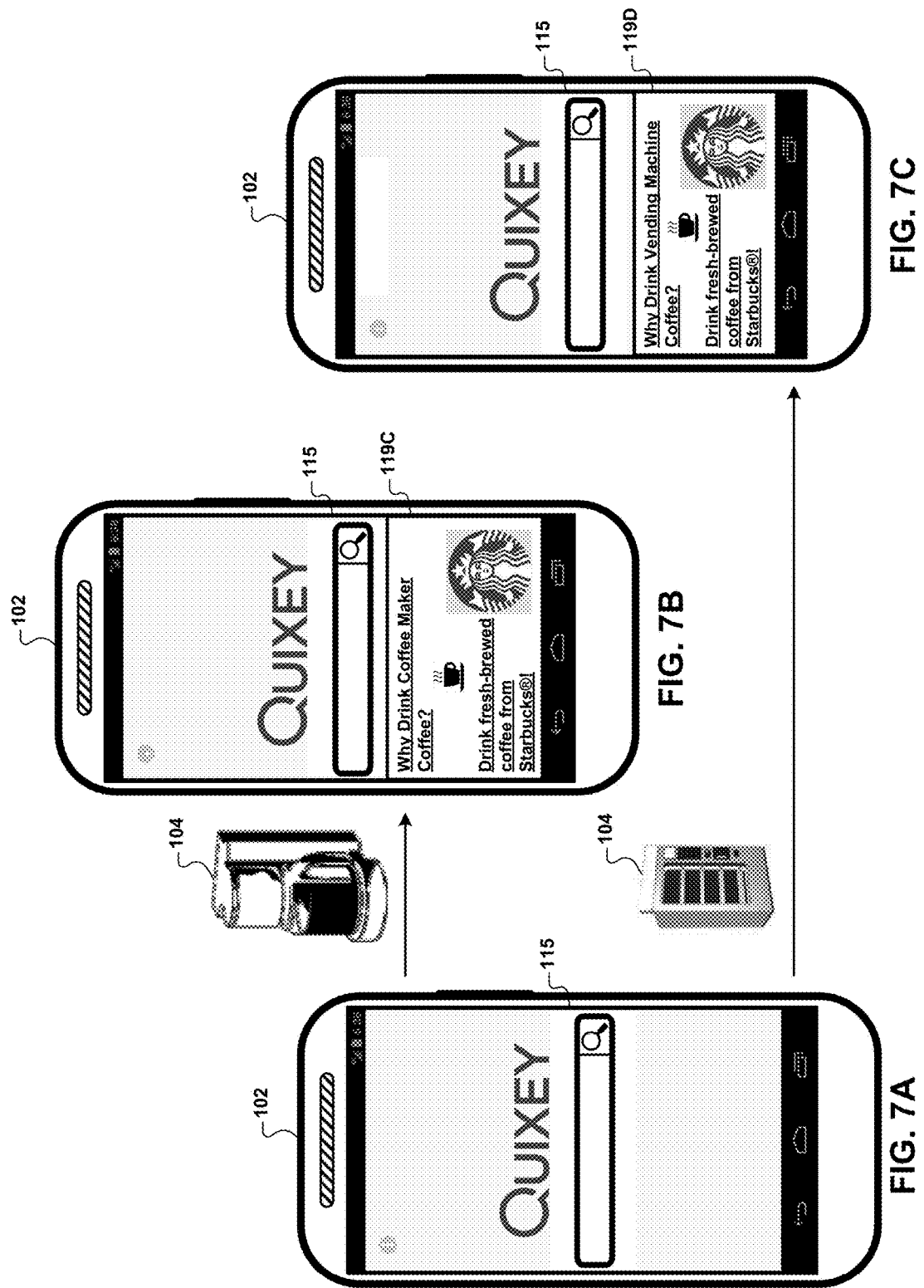

PERSONALIZING ADVERTISEMENTS BASED ON PROXIMATE COMPUTING DEVICES

CROSS-REFERENCE TO RELATED APPLICATION

This application claims the benefit of U.S. Provisional Application No. 62/170,044 filed Jun. 2, 2015, which is hereby incorporated by reference in its entirety.

TECHNICAL FIELD

This disclosure generally relates to the field of advertisement, and more particularly to techniques for generating and displaying advertisements on user devices.

BACKGROUND

In recent years, the use of computers, tablets, smartphones, smart watches, and other stationary and mobile computing devices has grown significantly. Additionally, the presence of network connectivity among these and other devices has also increased. Today, many consumer and industrial computing devices and appliances are capable of being connected to local computer networks and even the Internet. Advertisers advertise products and services using a variety of different computing devices, including such networked and Internet-enabled devices. To efficiently and effectively advertise the products and services to users, the advertisers may advertise to targeted audiences, which may include specific groups of users or user device types.

SUMMARY

In one example, a method includes generating, using a user device, an advertisement (ad) including one or more of text and image data. The method further includes identifying, using the user device, a proximate device located proximate to the user device using a local wireless network. In this example, the proximate device is configured to communicate via the local wireless network. Also in this example, the user device identifying the proximate device includes the user device receiving an indication of the proximate device from the proximate device via the local wireless network. The method also includes, in response to identifying the proximate device, modifying, using the user device, the ad based on the identified proximate device, and displaying the modified ad to a user at the user device.

In another example, a computing device includes a network interface component configured to communicate with a local wireless network, a display device, one or more memory components configured to store computer-readable instructions, and one or more processing units configured to execute the instructions. In this example, the instructions, when executed by the processing units, cause the processing units to generate an ad including one or more of text and image data. The instructions further cause the processing units to receive an indication of a proximate device located proximate to the computing device via the local wireless network using the network interface component, and identify the proximate device based on the received indication. In this example, the proximate device is configured to communicate via the local wireless network. The instructions also cause the processing units to, in response to identifying the proximate device, modify the ad based on the identified proximate device, and display the modified ad to a user using the display device.

BRIEF DESCRIPTION OF DRAWINGS

The details of one or more examples are set forth in the accompanying drawings and the description below. Other features, objects, and advantages will be apparent from the description and drawings, and from the claims.

FIG. 3A is a functional block diagram of an example ad system.

FIGS. 3B-3C are functional block diagrams of an example ad modification module and an example ad data store.

FIGS. 5A-5C are flow diagrams that illustrate example methods for personalizing ads based on proximate devices using a user device and an ad system.

FIGS. 6A-7C depict example graphical user interfaces (GUIs) that may be generated on a user device according to the present disclosure.

DETAILED DESCRIPTION

Figure 1:
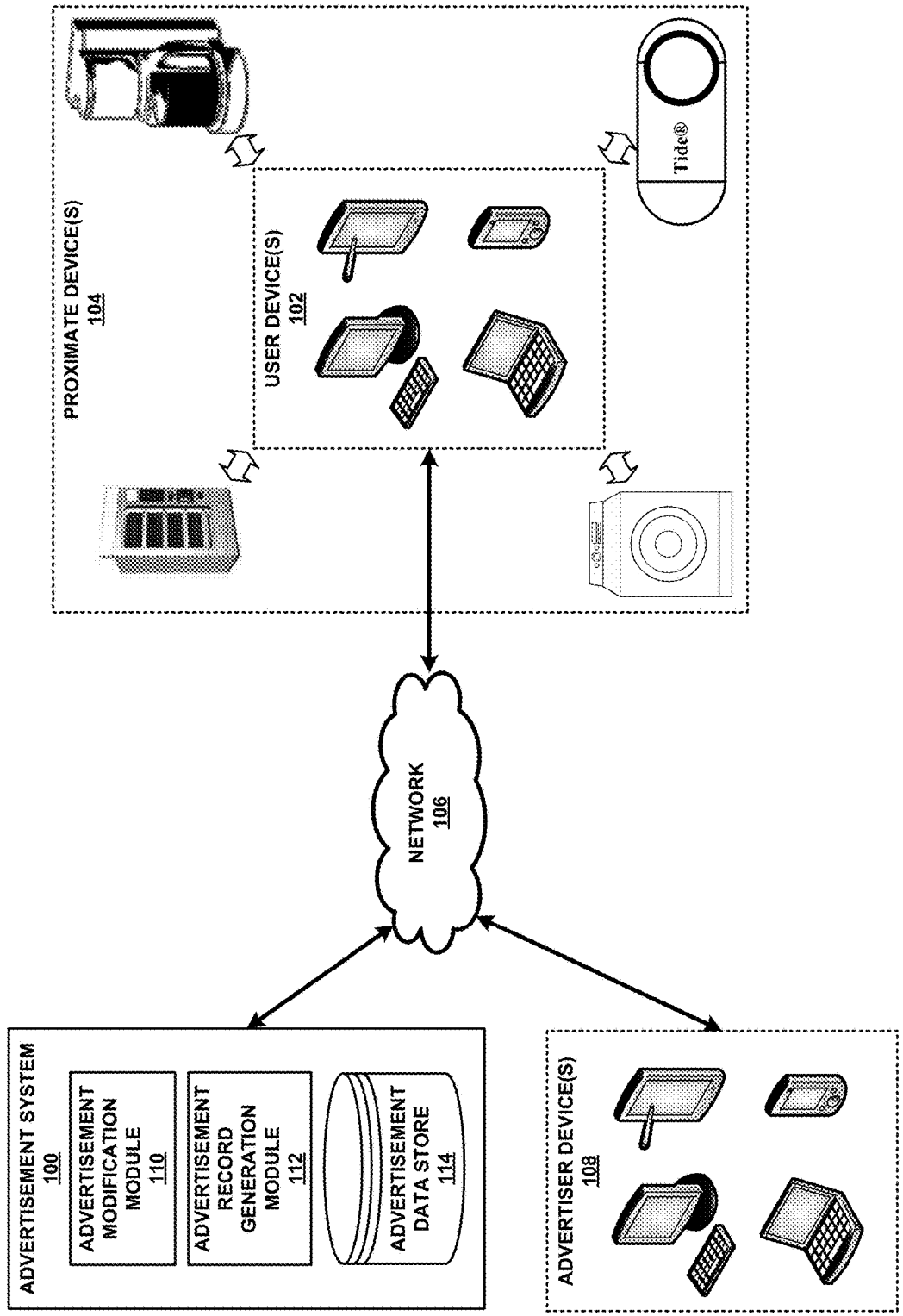
FIG. 1 depicts an example environment that includes one or more user devices, one or more proximate devices, one or more advertiser devices, and an advertisement (ad) system that communicate via a network.

The figures and the following description relate to example implementations by way of illustration only. It should be noted that from the following discussion, alternative implementations of the structures and methods disclosed herein will be readily recognized as viable alternatives that may be employed without departing from the scope of this disclosure.

The present disclosure generally relates to the field of advertising, and, more particularly, to techniques for generating and displaying advertisements (ads) on user devices. According to the techniques of this disclosure, a user device (e.g., a smart watch, smartphone, tablet computer, or laptop computer) may be located proximate to (e.g., nearby) one or more other devices (e.g., one or more consumer and/or industrial devices) that are capable of indicating their proximity to the user device. In other words, the proximate devices may be capable of indicating their presence near the user device to the device. For example, the proximate devices may include one or more network-connected (e.g., communicatively coupled via a computer network, or "networked") computing devices and/or appliances. In some examples, the proximate devices may include any of networked desktop computers, printers, routers, smart televisions, gaming consoles, and wireless speakers. Additionally, or alternatively, the proximate devices may include any of networked home thermostats, light switches, refrigerators, microwaves, toasters, crock-pots, and other home and kitchen devices and appliances. In some examples, the proximate devices may be networked using any of Wi-Fi, Bluetooth, near-field communication (NFC), ZigBee, Z-Wave, radio frequency identification (RFID), and/or other short-range local wireless communication protocols, interfaces, and technologies. In these examples, the proximate devices may be further networked using any of Ethernet, USB, optical fiber, power line and/or other wired communication protocols, interfaces, and technologies. As a specific example, the proximate devices may include one or more devices commonly referred to as "Internet of Things" (IoT) devices that are connected to a local network and, e.g., the Internet, via a wired and/or wireless communications interface. In this disclosure, the user device may include any computing device that is capable of connecting to and interacting with one or more of the proximate devices via any of the local wireless communication protocols, interfaces, and technologies described herein. In some examples, the user device may also be capable of connecting to and interacting with other computing devices via any of the wired communication protocols, interfaces, and technologies described herein.

According to the disclosed techniques, the proximate devices may be configured to indicate their proximity to the user device via a local wireless communication protocol, interface, or technology (e.g., any of the local wireless communication protocols, interfaces, and technologies described herein). Specifically, each proximate device may be configured to transmit an indication of the device to the user device via a short-range local wireless network (e.g., Wi-Fi, Bluetooth, or NFC). A local wireless network, as used herein, may refer to any communication protocol, interface, or technology that enables two or more computing devices to exchange data wirelessly over a relatively short distance (e.g., up to 10-100 meters). Using the local wireless network, a first computing device may transmit data wirelessly to a second, different computing device. In some examples, the second computing device may also transmit data wirelessly to the first computing device using the local wireless network. As a result, the proximate device transmitting the indication of the device to the user device via the short-range local wireless network may indicate that the proximate device is located proximate to (e.g., nearby) the user device. In some examples, the proximate device may transmit the indication to the user device as part of actively communicating with the user device (e.g., the proximate device may be communicatively coupled with the user device). In other examples, the proximate device may transmit the indication to the user device as part of (e.g., in response to) the user device scanning for, or "pinging" (e.g., querying to determine a connection with, or activity of) nearby devices using a local wireless network (e.g., Wi-Fi, or Bluetooth). In still other examples, the proximate device may transmit the indication as part of a transmission (e.g., a broadcast) intended for one or more computing devices other than the user device (e.g., as part of pairing the proximate device with, or transmitting data to, the computing devices). In these examples, the user device may receive the indication as a result of the transmission (e.g., by listening for and/or receiving the transmission). In other words, in some examples, the user device may not transmit any data to the identified proximate device as part of receiving the indication of the proximate device from the proximate device. In this manner, the user device may receive the indication as a result of various types of data transmission by the proximate device, including data transmission directly to the user device, and data transmission to one or more other computing devices. As described herein, the proximate device may transmit the indication to the user device over a local wireless network. In some examples, the proximate device may transmit the indication wirelessly using an intermediate device, such as a wireless router, a Wi-Fi adapter, or a Bluetooth adapter.

In this disclosure, one or more such indications received by the user device from one or more proximate devices that are located proximate to the user device may be referred to as a "snapshot" of the proximate devices from the standpoint of the user device. According to the disclosed techniques, upon receiving the indications (e.g., the snapshot), the user device may identify the proximate devices as located proximate to the user device. As one example, the user device may identify each proximate device as being located proximate to the user device. As another example, the user device may identify a subset of the proximate devices as being located proximate to the user device. As a specific example, the user device may identify one or more of the proximate devices as being located the most proximate (e.g., closest) to the user device.

In this example, the user device (e.g., using an ad system) may generate one or more ads including text and/or image data. The user device generating an ad, as used herein, may refer to the device generating the ad or receiving the ad from another location (e.g., an ad system). Upon identifying the one or more proximate devices, the user device (e.g., using the ad system) may further modify (e.g., personalize) the ads based on the identified proximate devices. For example, the user device may modify a particular aspect of the ads commonly referred to as the "ad creative," which may include the design, layout, and/or graphical components or other aspects of the ads. The user device may then display the modified ads to a user. As described herein, the ads may be originally specified by one or more advertisers of various products and services. As also described herein, the user device may modify the ads to personalize, or tailor, the ads to the user based on the identified proximate devices located proximate to the user device and, thus, to the user. Specifically, the user device may modify the ads based on the identified proximate devices, their types (e.g., device categories), and/or their specific states at the time the devices were identified. In some examples, the user device may modify the ads in response to identifying the proximate devices. In other examples, the user device may modify the ads at a later point in time after identifying the proximate devices. In still other examples, after identifying the proximate devices, the user device may modify the ads in response to another event (e.g., a user input, or a specific state of the user device), or automatically (e.g., at regular time intervals). For example, the user device may modify the ads based on a timed event (e.g., using a timer of a software application, or "app," included on the device), upon the user performing a search using the device, or in response to the user browsing and/or interacting with a web page or a state of a software app on the device. In additional examples, the user device may identify the proximate devices in response to the event, and then modify the ads based on the identified proximate devices.

In this manner, the techniques of the present disclosure may, in some examples, enable advertisers to effectively and efficiently advertise various products and services. The techniques may also enable generating ads that are more relevant to device users compared to other techniques (e.g., ad targeting using geo-location, explicit or inferred user demographic, or user searching and/or browsing history). For example, using the techniques, advertisers may generate personalized ads for products or services that are directly applicable, complementary, or tangentially related to computing devices or appliances located near user devices. As a result, the techniques may enable the advertisers to advertise the products or services to device users who are more likely to desire the products or services and interact with the corresponding ads. Accordingly, the techniques may enable the advertisers to advertise the products or services relatively more effectively. Additionally, by enabling the advertisers to automatically personalize the ads in response to determining that the computing devices or appliances are located near the user devices, the techniques may further enable the advertisers to advertise the products or services relatively more efficiently in terms of time and resources used. In general, the disclosed techniques may improve upon other ad personalization methods that do not make use of information regarding nearby devices (e.g., techniques that modify ads for location-specific products, services, and/or businesses using backgrounds or other visual elements that reflect the corresponding locations). As a result, the techniques may enable generating ads that are relatively more personalized compared to other ads (e.g., those generated using solely user device and/or user information), thus maximizing the chance of user engagement with the ads.

FIG. 1 is a functional block diagram that illustrates an example environment including one or more user devices 102, one or more proximate devices 104, an ad system 100, and one or more advertiser devices 108 that communicate via one or more networks. As shown in FIG. 1, the ad system 100 includes an ad modification module 110, an ad record generation module 112, and an ad data store 114, which are described in greater detail below. The network 106 through which the user device(s) 102, the ad system 100, and the advertiser device(s) 108 communicate may include any type of network, such as a local area network (LAN), a wide area network (WAN), and/or the Internet. As described herein, the user device(s) 102 may communicate with the proximate device(s) 104 via any local wireless communication protocols, interfaces, or technologies (e.g., a local wireless network), including Wi-Fi, Bluetooth, and NFC.

In the example of FIG. 1, one of the user device(s) 102 may initially generate one or more ads each including text and/or image data. For example, the user device 102 may generate the ads using information stored on the device 102 (e.g., locally stored ads). Alternatively, the user device 102 may receive the ads from the ad system 100. In some examples, the user device 102 may generate the ads based on one or more of the proximate device(s) 104 that are located proximate to the user device 102. Additionally, or alternatively, the user device 102 may generate the ads using other information (e.g., information associated with the device 102 and/or a user of the device 102, such as geo-location, user demographic, user searching, browsing, and social network activity history, contacts, call, text, and chat history, and other information). For example, the user device 102 may generate the ads as part of the user browsing and/or interacting with a web page via a web browser app, or a state of a native app, included on the device 102. In still other examples, the user device 102 may generate the ads based on other events (e.g., a user input, or a specific state of the device 102), and/or automatically (e.g., at regular time intervals).

The ads may include any combination of text and image (and, e.g., audiovisual) data that describe an ad for a product, service, and/or business. In some examples, the ads may be associated with one or more states of one or more web-based apps (e.g., software apps that are accessible from a user device 102 via a web browser app), or one or more native apps (e.g., software apps that are installed and executed on a user device 102). For example, the ads may specify one or more monetary discounts or other promotions associated with the states. In these examples, the ads may include one or more user selectable links that, when selected by the user, direct the user device 102 to the states in the web-based or native apps. Also in these examples, the user selectable links may indicate (e.g., using text and/or image data) to the user the corresponding states in the web-based or native apps. In other examples, the ads may specify monetary discounts or promotions that are not directly associated with states of web-based or native apps (e.g., as in the case of ads for in-store or catalog purchases).

In this example, the user device 102 further identifies one or more of the proximate device(s) 104 that are located proximate to (e.g., nearby) the user device 102. For example, the user device 102 may identify the proximate devices 104 in response to the devices 104 indicating their proximity to the user device 102 (e.g., as part of actively communicating with the device 102, or with another computing device) via a local wireless network. For instance, the user device 102 may identify one or more of the (e.g., the closest) proximate device(s) 104 as being located proximate to the user device 102. In some examples, the user device 102 may further determine one or more types (e.g., categories) associated with the identified proximate devices 104, as described herein. Additionally, or alternatively, the user device 102 may determine one or more states of the identified proximate devices 104, as also described herein. In some examples, the user device 102 may transmit an indication of the ads generated by the device 102 and an indication of the identified proximate devices 104, of one or more types associated with the devices 104, and/or of one or more states of the devices 104, to the ad system 100. In these examples, the ad system 100 may receive the indications from the user device 102, modify the ads based on the indications, and transmit the modified ads to the device 102. For example, as described herein, the ad system 100 (e.g., the ad modification module 110) may modify the ads based on the indications and using data included in the ad data store 114. As also described herein, the data included in the ad data store 114 may be specified by one or more advertisers via the advertiser device(s) 108. Upon receiving the modified ads from the ad system 100, the user device 102 may display the ads to a user (e.g., within, or adjacent to, a state of a software app executing on the device 102). Alternatively, the user device 102 may modify the ads based on the identified proximate devices 104, their types, and/or their states locally, in a similar manner as described with reference to the ad system 100, and display the modified ads to the user.

The user device 102 may modify the ads based on the identified proximate devices 104 using any of a variety of techniques. As one example, as described herein, the user device 102 may modify the ads using the identified proximate devices 104. For example, the user device 102 may modify the ads using the identified proximate devices 104 as contextual information regarding the device 102 and/or the user. In one example, the user device 102 may modify an ad to indicate a smart television upon determining that the device 102 is located proximate to a particular smart television model name and/or number. In another example, the user device 102 may modify an ad to indicate printer ink cartridges upon determining that the device 102 is located proximate to a specific networked printer model name and/or number. In these examples, the identified proximate devices 104 may be indicated using so-called "device IDs" of the devices 104. The device IDs may be represented using textual and/or numerical data.

As another example, as also described herein, the user device 102 may modify the ads using categories, or types, associated with the identified proximate devices 104, e.g., again as contextual information regarding the device 102 and/or the user. In one example, the user device 102 may modify an ad to indicate a fitness band upon determining that the device 102 is located proximate to a particular fitness band, irrespective of its model name and/or number. In another example, the user device 102 may modify an ad to indicate ground or whole coffee beans upon determining that the device 102 is located proximate to a networked coffee maker, again irrespective of its model name and/or number. In these examples, the types of the identified proximate devices 104 may be indicated using so-called "type IDs" generated using information associated with the devices 104 (e.g., device IDs and/or other device information). The type IDs may be represented using textual and/or numerical data in some examples.

As still another example, as further described herein, the user device 102 may modify the ads using states of the identified proximate devices 104, e.g., again as contextual information regarding the device 102 and/or the user. In other words, the user device 102 may modify an ad for a specific product, service, and/or business upon determining that the device 102 is located proximate to a particular proximate device 104 or proximate device type that indicates a given state. Using a previous example, the user device 102 may modify an ad to indicate printer ink cartridges upon determining that the device 102 is located proximate to a (e.g., specific model of) networked printer that is nearly or completely out of printer ink. As another example, the user device 102 may modify an ad to indicate a crock-pot upon determining that the device 102 is located proximate to a networked crock-pot (e.g., irrespective of its model) that indicates a malfunction (e.g., a hardware fault). As still another example, the user device 102 may dynamically modify ads to indicate different hot or cold food items or beverages depending on whether a (e.g., specific model, or a general type of) networked home thermostat located proximate to the device 102 indicates a particular indoor or outdoor temperature, temperature range, or ongoing mode of operation (e.g., cooling, or heating). In these examples, the states of the identified proximate devices 104 or of proximate device types may be indicated using so-called "state IDs" generated using information associated with the devices 104 or types (e.g., device IDs, type IDs, or other device information) and including textual and/or numerical data.

In some examples, the user device 102 may modify the ads by performing searches for the associated ad data using the identified proximate devices 104, their types, and/or their states, as described herein. In other examples, the user device 102 may modify the ads using ad logic that associates the identified proximate devices 104, their types, and/or their states with the corresponding ad data, as also described herein. For example, the ad logic may specify a mapping between each identified proximate device 104, its type, and/or its state and one or more ad records that include the ad data. In one example, the mapping may associate a model name and/or number (e.g., as indicated by a device ID) of the identified proximate device 104 with the one or more ad records. In another example, the mapping may associate a category, or type (e.g., as indicated by a type ID), of the identified proximate device 104 with the one or more ad records. In still another example, the mapping may associate a state of the identified proximate device 104 or of its device type (e.g., as indicated by a state ID) with the one or more ad records. In general, the mapping may associate any combination of one or more model names and/or numbers, types, and states of one or more of the identified proximate devices 104 with one or more ad records. In some examples, the mapping may be generated and/or updated manually by the advertisers or third parties (e.g., companies or organizations that operate the ad system 100). Additionally, or alternatively, the mapping may be generated and/or updated manually and/or automatically using historical user behavioral data (e.g., data indicating past user actions with respect to one or more of the user device(s) 102, such as browsing and/or purchasing products or services, when in proximity to one or more of the proximate device(s) 104). In additional examples, the mapping may also be updated based on user ad selection data that indicates whether the user has selected one or more of the modified ads on the user device 102.

In this manner, the ads modified, or "personalized," by the user device 102 based on the identified proximate devices 104 may be directly applicable to the devices 104 (e.g., offering equivalent or improved products or services) and/or complimentary to the devices 104 (e.g., offering accessories, enhancements, and/or associated products and services). In some examples, the modified ads may be tangentially related, although not directly applicable or complimentary, to the proximate devices 104 (e.g., offering products or services that the user is likely interested in given the devices 104, their types, and/or their states). As a specific example, the user device 102 may modify an ad to indicate a tropical adventure vacation based on an identified proximate device 104 corresponding to smart adventure gear used in snow, irrespective of whether the user is able to use the device 104 during the advertised vacation.

As described herein, in some examples, to modify the ads, the user device 102 may use the ad system 100. In these examples, the ad system 100 may be a part of the user device 102, a part of another system or device, or a stand-alone system or device. The ad system 100 may include ad content used to modify one or more ads. The ad content may be defined (e.g., specified) by one or more advertisers using the ad system 100 (e.g., via the advertiser device(s) 108). As described herein, the user device 102 may transmit an indication of the ads generated by the device 102 (e.g., the ads themselves, or one or more ad IDs that identify the ads in the ad data store 114) and an indication of the identified proximate devices 104, their types, and/or their states to the ad system 100. The ad system 100 may receive the indications from the user device 102, modify the ads using the indications and the ad content, and transmit the modified ads to the device 102. For example, the user device 102 may transmit the indications to the ad system 100 as part of an ad request, thereby offering the system 100 an opportunity to fulfill the request (e.g., modify the ads). The ad system 100 may modify the ads in response to receiving the ad request and transmit the modified ads to the user device 102.

The advertisers may generate the ad content using any of a variety of techniques. In general, the advertisers may generate the ad content by bidding via the ad system 100 to have personalized ads for products, services, and/or businesses shown to users of user devices 102 that are located proximate to one or more sponsored proximate devices, sponsored proximate device types, and/or sponsored proximate device states. In some examples, the advertisers may bid on one or more specific proximate devices 104 (e.g., model names and/or numbers, such as the "UN65JU7500FXZA" smart television by Samsung®). In these examples, the proximate devices 104 may be indicated using device IDs. In other examples, the advertisers may bid on one or more categories, or types, of proximate devices 104 (e.g., specific or broad device types, such as "Fitbit® fitness bands," "smart televisions," or "kitchen appliances"). In these examples, the proximate device types may be indicated using type IDs. In still other examples, the advertisers may bid on one or more states of proximate devices 104, or one or more states of proximate device types (e.g., a "low ink" state of a "WorkForce Pro WP-4010" Epson® networked printer, or a "cooling" state of any Nest® networked home thermostat). In these examples, the proximate device or device type states may be indicated using state IDs.

In the examples described herein, the ad system 100 may store the ad content specified by the advertisers in one or more ad records included in the ad data store 114. In some examples, the ad system 100 (e.g., the ad modification module 110) may modify the ads by performing searches for ad records included in the ad data store 114 that specify one or more of the identified proximate devices 104, their types, and/or their states indicated by the user device 102. In other examples, the advertisers may specify ad data used to modify one or more ads for one or more products, services, and/or businesses without associating the data with any proximate devices 104, proximate device types, or proximate device states. In these examples, ad logic and associated (e.g., mapping) data specified by the advertisers or a third party (e.g., a company or organization that operates the ad system 100) may be configured to associate the ad data with one or more of the identified proximate devices 104, their types, and/or their states. As described herein, the ad logic and/or the associated data may be generated and/or updated over time manually and/or automatically using any combination of user input, historical user behavioral data, and user ad selection data. In some examples, the ad logic data, the historical user behavioral data, and/or the user ad selection data may be stored in the ad data store 114.

To modify the ads, the ad system 100 may identify ad records included in the ad data store 114 using any of a variety of techniques. In some examples, the ad system 100 may identify one or more ad records that specify the identified proximate devices 104, their types, and/or their states. The ad system 100 may then select those of the identified ad records that are associated with (e.g., that specify) the highest one or more advertiser bids (e.g., prices). In other examples, the ad system 100 may generate a score for each identified ad record. The score may indicate a likelihood of maximizing ad revenue by modifying an ad using the corresponding ad record. For example, the score may be generated using any combination of the associated advertiser bid and an expected probability that a user will select the resultant modified ad (e.g., score=Bid_price*P (click_on_ad), where "Bid_price" is the advertiser bid and "P(click_on_ad)" is the expected probability). The expected probability may be calculated using historical user ad selection data (e.g., data indicating past user selections of modified ads while browsing and/or purchasing products or services). In these examples, the ad system 100 may select those of the scored identified ad records having the highest scores. In further examples, the ad system 100 may identify one or more ad records using the identified proximate devices 104, their types, and/or their states and a mapping and select those of the identified records that are associated with the highest one or more advertiser bids or scores, in a similar manner as described above.

The techniques of this disclosure may also optionally include any of the following features. In some examples, the user device 102 may modify the ads in response to determining that the identified proximate devices 104 exclude one or more devices (e.g., specific model names and/or numbers), device types (e.g., broad or general device categories), and/or device states (e.g., states of particular devices or device types). As one example, the user device 102 may modify an ad to indicate a specific model of a Fitbit® fitness band upon determining that the identified proximate devices 104 do not include that model. In this example, the user device 102 may determine that the identified proximate devices 104 include another model of a fitness band (e.g., Garmin® Vivofit). As another example, the user device 102 may modify an ad to indicate a smart air conditioner upon determining that the identified proximate devices 104 do not include any smart air conditioners, irrespective of model name and/or number. In other examples, the user device 102 may modify the ads in response to determining that the identified proximate devices 104 include (e.g., fall into) one or more device categories (e.g., types), but exclude one or more specific devices within those categories. For example, the user device 102 may modify an ad to indicate a particular smart kitchen appliance model (e.g., a KitchenAid® smart appliance) upon determining that the identified proximate devices 104 include one or more smart kitchen appliances, but do not include that model. In other examples, the user device 102 may modify an ad to indicate a product, service, or business (e.g., a specific model of a wireless router) upon determining that an identified proximate device 104 is not in a particular state (e.g., a wireless router that is actively transmitting data, indicating its proper operation).

In some examples, the user device 102 may modify the ads in response to determining ownership of the identified proximate devices 104. As one example, the user device 102 may definitively determine whether the user owns or is otherwise associated with one or more of the identified proximate devices 104. For example, the user may register one or more of the proximate device(s) 104 via the user device 102. As a result, the user device 102 may store device information, such as device IDs, associated with the registered proximate devices on the device 102 and/or in another network location (e.g., via cloud storage). The user device 102 may then determine whether the identified proximate devices 104 include any of the registered proximate devices using the device information, thereby establishing the user's ownership of or association with one or more of the identified proximate devices 104. As another example, the user device 102 may infer whether the user owns or is associated with one or more of the identified proximate devices 104. For example, the user device 102 may predict whether an identified proximate device 104 is owned by or associated with the user by determining any of the following: whether (and, e.g., how frequently) the user has previously interacted with the device 104 (e.g., via the user device 102); whether (and, e.g., how frequently) the user device 102 has been located proximate to the device 104; and whether the user owns or is associated with other devices that are similar to the device 104 (e.g., the user owning or being associated with a given device may make it more or less likely that the user also owns or is associated with a similar device). Upon determining the ownership or association of the identified proximate devices 104, the user device 102 may modify the ads using various techniques. In some examples, the user device 102 may modify an ad to indicate an identified proximate device 104 if the device 104 is owned by or associated with the user, and otherwise refrain from modifying the ad. In other examples, the user device 102 may modify ads to indicate an identified proximate device 104 differently depending on whether the device 104 is owned by or associated with the user. For example, upon determining that the user device 102 is located proximate to a networked printer owned by or associated with the user, the device 102 may modify an ad to indicate printer ink cartridges that are compatible with the printer. Alternatively, upon determining that the networked printer is not owned by/associated with the user, the user device 102 may modify an ad to indicate a networked printer of the same or different model/brand.

In some examples, the user device 102 and ad system 100 may modify the ads by taking into consideration user privacy. As one example, upon identifying the proximate devices 104, the user device 102 may transmit a generalized version (e.g., a summary) of the indication of the devices 104 to the ad system 100. For example, after determining one or more specific model names and/or numbers (e.g., device IDs) of the identified proximate devices 104, the user device 102 may transmit data describing one or more general categories, or types (e.g., type IDs) associated with the devices 104 to the ad system 100. As another example, upon determining one or more specific categories (e.g., specific type IDs) of the identified proximate devices 104, the user device 102 may transmit data describing one or more general categories (e.g., broader type IDs) associated with the devices 104 to the ad system 100. As still another example, upon determining one or more states (e.g., state IDs) of the identified proximate devices 104, the user device 102 may transmit to the ad system 100 an indication of each state along with data describing a category (e.g., a type ID) associated with the corresponding device 104, rather than a specific device model name and/or number (e.g., a device ID) of the device 104. In this example, the ad system 100 may modify the ads using the generalized version of the indication of the identified proximate devices 104, their types, and/or their states, rather than the indication. As still another example, the user device 102 may transmit an encrypted (e.g., compressed) version of the indication of the identified proximate devices 104, their types, and/or their states to the ad system 100. For example, the user device 102 may transmit the indication using a Bloom filter representation. In this example, instead of indicating the identified proximate devices 104, their types, and/or their states directly, the representation may indicate whether the devices 104 potentially include, or definitively do not include a given device, type, and/or state.

As still another example, the user device 102 may refrain from transmitting the indication to the ad system 100 altogether. In this example, the user device 102 may modify the ads using ad data provided by the ad system 100 and the identified proximate devices 104, their types, and/or their states. For example, the ad system 100 may initially generate a set of so-called "candidate" ads and transmit the set to the user device 102. The user device 102 may then use the identified proximate devices 104, their types, and/or their states (and, e.g., ad logic) to select the modified ads from (e.g., select a subset of) the set.

As one example, the user device 102 may dynamically select one or more of the candidate ads from the set based on the identified proximate devices 104, their types, and/or their states. In some examples, each candidate ad may be associated with one or more of the proximate device(s) 104, their types, and/or their states. For example, each candidate ad may specify a product, service, and/or business that is directly applicable or complementary to the proximate device(s) 104, types, and/or states. In these examples, upon identifying the proximate devices 104, the user device 102 may select one or more candidate ads from the set that are associated with the identified devices 104, their types, and/or their states. For example, upon identifying the proximate devices 104, the user device 102 may first generate a score for each candidate ad included in the set based on the identified devices 104, and then select one or more highest-scoring candidate ads from the set. The user device 102 may generate the score for each candidate ad when the device 102 identifies a proximate device associated with the ad (e.g., the ad may be represented using the instructions "candidate_ad_ID=3781, ad text="Why do your own laundry when we can do it for you?," score=0.8 if user.near<washing_machine>").

In a specific example, the user device 102 may initially generate multiple candidate ads for store-brewed Starbucks® coffee. Each candidate ad may be associated with one or more proximate devices and/or types, such as specific commercial coffee vending machines and home coffee makers and/or general categories of these devices. In other words, each candidate ad may specify a product (i.e., store-brewed Starbucks® coffee) that is directly applicable (e.g., adverse) to these proximate devices and/or types. For example, each candidate ad may specify a product that is similar to the proximate devices (e.g., a replacement for the devices), rather than complementary to the devices (e.g., an accessory for the devices). In this example, upon identifying, e.g., a proximate coffee vending machine, the user device 102 may select a candidate ad that is associated with the machine or with coffee vending machines, generally. For example, the user device 102 may select a candidate ad that states "Why drink vending machine coffee? Try Starbucks coffee!" Alternatively, also in this example, upon identifying, e.g., a proximate Keurig® coffee brewer, the user device 102 may select a different candidate ad that is associated with this coffee brewer or with home coffee makers in general. For example, the user device may select a candidate ad that states "K-cups are old-hat. Drink fresh coffee from Starbucks!"

In other examples, each candidate ad may be an element (e.g., a GUI element, such as a dynamic background) including text and/or image data that is included in a variable field of a particular ad that specifies a product, service, and/or business that is directly applicable or complementary to one or more proximate devices, types, and/or states. In these examples, each candidate ad may be associated with (e.g., be specific to) one or more of the proximate devices, types, and/or states. Upon identifying the proximate devices 104, the user device 102 may select one or more candidate ads that are associated with the identified devices 104 for inclusion within the ad. For example, upon identifying the proximate devices 104, the user device 102 may first generate a score for each candidate ad based on the identified devices 104, and then select one or more highest-scoring candidate ads for inclusion in the ad.

In a specific example, the user device 102 may initially generate multiple overlays (e.g., including image and/or text data) for an ad for GreenClean® cleaning services that includes the text "Let GreenClean® do your laundry." Each overlay may be associated with one or more proximate devices 104 and/or types, such as specific commercial or consumer washing machines and dryers, or other devices or device types that are directly applicable to the advertised cleaning services. In this example, upon identifying, e.g., a proximate smart washing machine or dryer, the user device 102 may select an overlay that states "Why do your own laundry?" and include the selected overlay in the ad as follows: "Why do your own laundry? Let GreenClean® do your laundry." Alternatively, upon identifying, e.g., a proximate Amazon® Dash Button® for Tide® detergent, the user device 102 may select an overlay that states "Why buy Tide®?" and generate the ad "Why buy Tide®? Let GreenClean® do your laundry" using the selected overlay.

As another example, the user device 102 (e.g., the ad system 100) may initially generate one or more so-called ad "templates." The user device 102 may then dynamically modify the ad templates based on the identified proximate devices 104. For example, each ad template may specify a product, service, and/or a business and include a general reference to (e.g., a placeholder for) one or more proximate devices, their types, and/or their states, or a directly applicable or complementary product, service, and/or business associated with the devices, types, and/or states. In this example, upon identifying the proximate devices 104, the user device 102 may populate the ad templates by specifying (e.g., inserting indications of) one or more of the identified devices 104 or the associated products, services, and/or businesses in place of the corresponding general references. In some examples, each ad template may be associated with one or more conditions and/or rules that define how the template is populated based on the identified proximate devices 104. For example, the conditions may specify one or more proximate devices that result in the ad template being populated. Additionally, the rules may specify one or more proximate devices, types, and/or states, or associated products, services, and/or businesses used to populate the ad template. In other examples, the user device 102 may generate a score for each populated ad template based on the identified proximate devices 104 and select one or more highest-scoring populated ad templates.

As one example, upon identifying a proximate coffee vending machine, the user device 102 may populate an ad template "Why drink X coffee? Get fresh-brewed coffee from Starbucks instead," where X serves as a placeholder for any of "coffee vending machine," "home coffee maker," and indications of other coffee-dispensing devices and/or device types. In this example, the populated ad template may be "Why drink coffee vending machine coffee? Get fresh-brewed coffee from Starbucks instead." In some examples, the ad template may be represented as one or more instructions (e.g., "if user.nearby <beverage_dispensing_device> then generate X where X=beverage_dispensing_device.name" or "if user.nearby <beverage_dispensing_device> then generate X where X=beverage_dispensing_device.type"). As another example, upon identifying a proximate Amazon® Dash Button® associated with Scott® paper towels, the user device 102 may populate an ad template "Why keep ordering Y? Let us deliver Y to your door weekly," where Y serves as a placeholder for indications of any consumer products associated with the Amazon® Dash Button® or other devices and/or device types. In this example, the populated ad template may be "Why keep ordering Scott® paper towels? Let us deliver Scott® paper towels to your door weekly." In some examples, the ad template may be represented as one or more instructions (e.g., "if user.nearby<Amazon_Dash_Button> and Amazon_Dash_Button.product="Scott® paper towels," then generate X where X=Amazon_Dash_Button.product"). In still other examples, the user device 102 may dynamically modify other aspects of the ad templates (e.g., background images) based on the identified proximate devices 104. For example, an ad template may be represented as instructions "if user.nearby<Amazon_Dash_Button>, then ad.background.color=Amazon_Dash_Button.product. primary_color."

In general, the user device 102 may modify the ads based on the identified proximate devices 104 using any combination of the techniques, features, and considerations described herein. For example, the user device 102 may modify the ads using any of the identified proximate devices 104, their types, their states and ad logic that associates the devices 104, types, and/or states with the modified ads. The user device 102 may also modify the ads based on absence of specific devices or general device types from the identified proximate devices 104, ownership of the devices 104, generalized versions of indications of the devices 104, their types, and/or their states, and encrypted versions of the indications. The user device 102 may further modify the ads by selecting the ads from sets of candidate modified ads, including static ads, variable elements of ads, and/or ad templates. Moreover, in some examples, the user device 102 may modify the ads using any of the above-described techniques, features, and considerations in conjunction with any other information associated with the user and/or the device 102, such as geo-location, a time of day, and a local temperature associated with the user and/or device 102.

As such, the techniques described herein may enable generating targeted ads using the proximate device(s) 104 instead of, or along with, other information commonly available on the user device(s) 102 (e.g., geo-location, user demographic, user searching, browsing, and social network activity history, contacts, call, text, and chat history, and other information). In some examples, using the proximate device(s) 104 in this manner may be advantageous because other information associated with users of the user device(s) 102 and/or the device(s) 102 may be unavailable, unreliable, or inaccessible. In other examples, the proximate device(s) 104 may represent more current or instantaneous contextual user data compared to the information associated with the users and/or user device(s) 102, which may represent older or averaged data.

In this disclosure, a software app may refer to computer software that causes a computing device to perform a task. In some examples, a software app may be referred to as an "app," or a "program." Example apps include word processing apps, spreadsheet apps, messaging apps, media streaming apps, social networking apps, and games. Apps can be executed on a variety of different computing devices. For example, apps can be executed on mobile computing devices, such as smartphones, tablets, and wearable computing devices (e.g., smart watches, fitness bands, and headsets, such as smart glasses). Apps can also be executed on other types of computing devices having other form factors, such as laptop and desktop computers, and other consumer electronic devices (e.g., smart home appliances, home networking devices, and home automation devices). In some examples, apps may be installed on a computing device prior to a user purchasing the device. In other examples, the user may download and install apps on the computing device after purchasing the device. A native app, as used herein, may refer to an app that is installed and executed on a user device 102. A web-based app may refer to an app that is accessible from a user device 102 via a web browser app.

An AM, as used herein, may include any of a native app AM (hereinafter, "AAM") and a web AM (hereinafter, "WAM"). As such, a user device 102 of this disclosure may use an AM to access the functionality provided by a native or web-based app. For example, a user of the user device 102 may select an ad that includes the AM to access the functionality of the native or web-based app. An AAM may be a string that references a native app and indicates one or more operations for a user device 102 (e.g., the app) to perform. If the user selects an ad that includes the AAM, the user device 102 may launch the native app referenced by the AAM and (e.g., cause the app to) perform the operations indicated by the AAM. In other words, the user selecting the ad may cause the user device 102 to launch the native app and set the app into a state (e.g., in which the app displays a graphical user interface (GUI), or screen) that corresponds to the operations. As a result, the native app may be configured to display one or more products, services, vendors, and/or associated monetary discounts to the user, e.g., via a display device of the user device 102. In this manner, the AAM may specify the state of the native app. The state, in turn, may refer to the operations indicated by the AAM and/or the outcome of the native app performing the operations in response to the user selecting the ad that includes the AAM. A WAM may include a resource identifier that references a web resource (e.g., a page of a web-based app, or website). For example, the WAM may include a uniform resource locator (URL) (i.e., a web address) used with the hypertext transfer protocol (HTTP). If the user selects an ad that includes the WAM, the user device 102 may launch a web browser app and retrieve the web resource referenced by the resource identifier. Stated another way, if the user selects the ad, the user device 102 may launch the web browser app and access a state (e.g., a page) of a web-based app, or website, specified by the WAM. The state of the web-based app may be configured to display one or more products, services, vendors, and/or associated monetary discounts to the user, in a similar manner as previously described.

Figure 2:
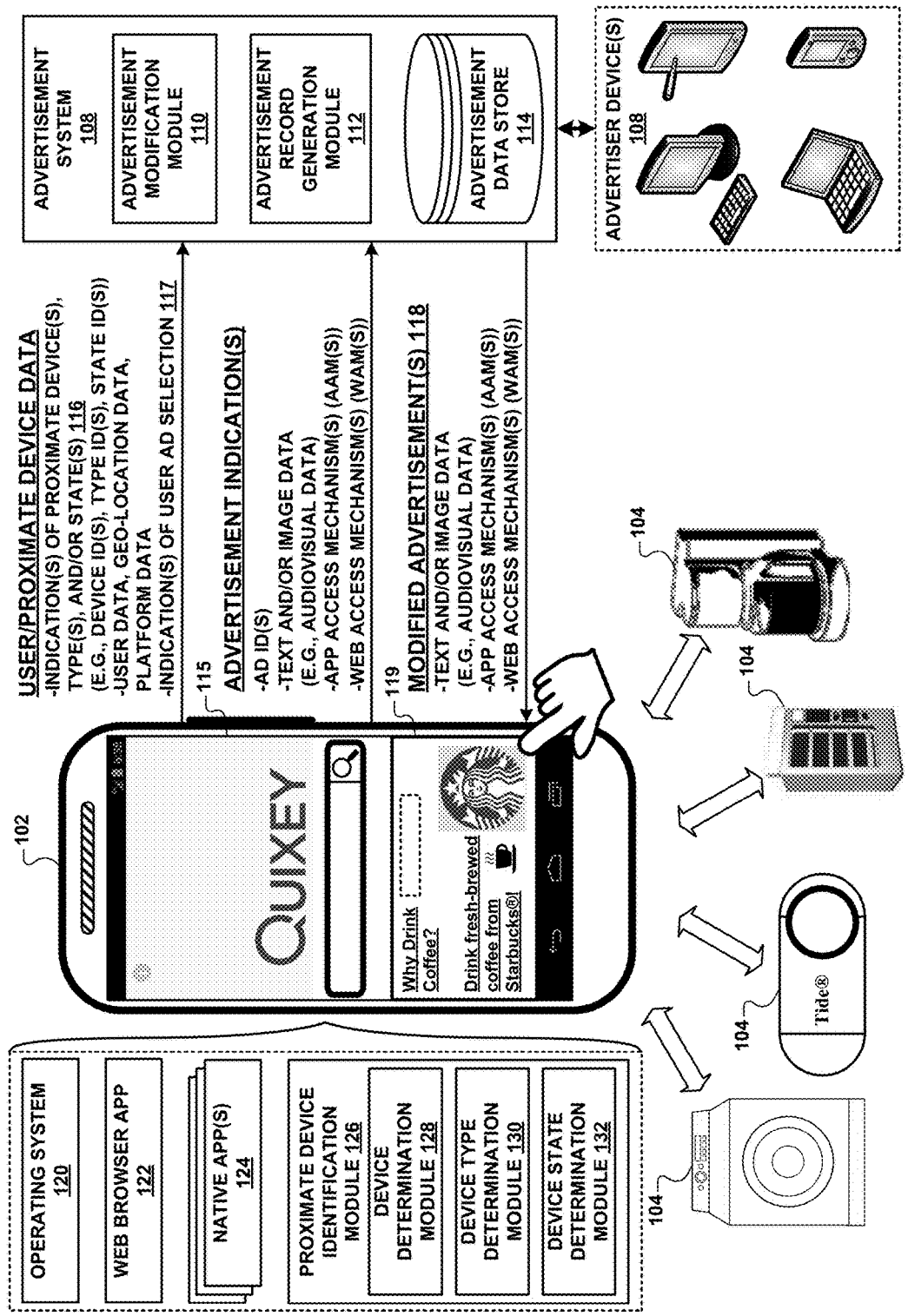
FIG. 2 depicts an example user device in communication with one or more example proximate devices and an example ad system.
Figure 4A:
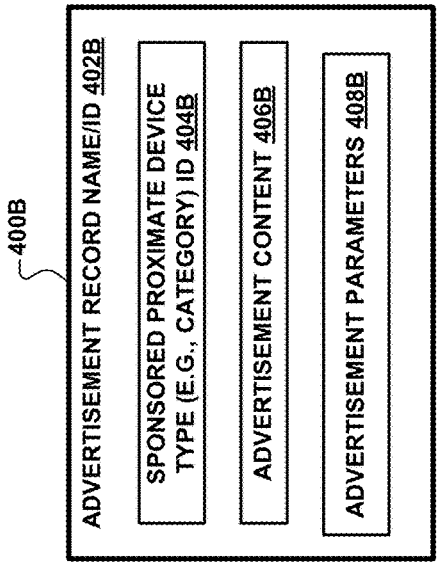
FIGS. 4A-4D depict example ad records.
Figure 4B:
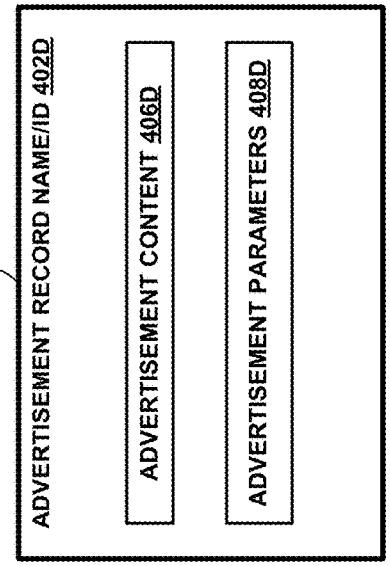
Figure 4C:
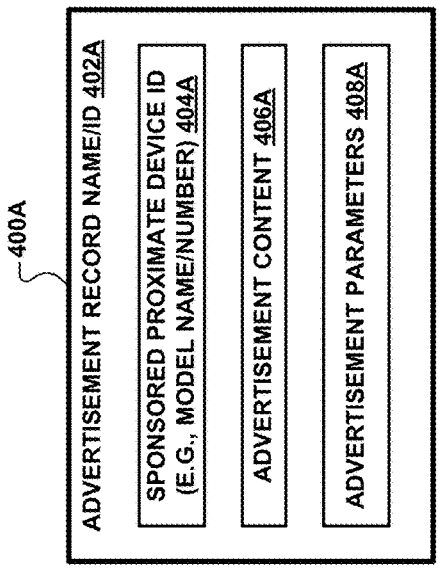
Figure 4D:
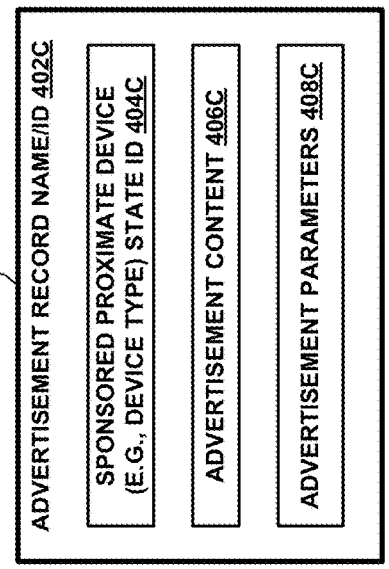

The user device(s) 102 may be any computing devices capable of providing indications of ads and the proximate device(s) 104, their types, and/or their states to the ad system 100 and receiving modified ads from the system 100. The user device(s) 102 may include any of smart watches, smartphones, and tablet or laptop computing devices. The user device(s) 102 may also include computing devices having other form factors, e.g., wirelessly-networked desktop computers, vehicle navigation systems, gaming devices, and smart televisions. The user device(s) 102 may use a variety of different operating systems or platforms (e.g., an operating system, or "OS," 120, as shown in FIG. 2). In the event a user device 102 is a mobile computing device, the device 102 may operate using an OS such as ANDROID® by Google Inc., IOS® by Apple Inc., or WINDOWS PHONE® by Microsoft Corporation. In the event the user device 102 is a stationary computing device, the device 102 may use an OS such as MICROSOFT WINDOWS® by Microsoft Corporation, MAC OS® by Apple Inc., or LINUX® (LINUX is the registered trademark of Linus Torvalds in the U.S. and other countries). In general, the user device(s) 102 may interact with the ad system 100 using operating systems other than those described herein, whether presently available or developed in the future.

The user device(s) 102 may communicate with the ad system 100 via the network 106. In general, the user device(s) 102 may communicate with the ad system 100 using any app that can transmit indications of ads and the proximate device(s) 104, their types, and/or their states to the system 100 and receive modified ads from the system 100. In some examples, the user device(s) 102 may include an app that is dedicated to interfacing with the ad system 100, such as an app dedicated to ads (e.g., any of one or more native apps 124, as also shown in FIG. 2). In other examples, the user device(s) 102 may communicate with the ad system 100 using a more general app, such as a web browser app (e.g., a web browser app 122, as further shown in FIG. 2). In general, an app included on a user device 102 to communicate with the ad system 100 may be configured to transmit indications of ads and the proximate device(s) 104, their types, and/or their states to the system 100. In some examples, the same app may also be configured to display a GUI used to display modified ads received from the ad system 100 in response to transmitting the indications. In other examples, a different (e.g., native or web-based) app may be configured to display the GUI. The GUI may display the modified ads in various ways, depending on the data transmitted by the ad system 100 to the user device 102.

The proximate device(s) 104 may be any computing devices capable of indicating their proximity to (e.g., presence near) the user device(s) 102 using a local wireless network (e.g., Wi-Fi, Bluetooth, or NFC). As described herein, the proximate device(s) 104 may include any networked computing devices and/or appliances, including desktop computers, printers, routers, televisions, gaming consoles, wireless speakers, thermostats, light switches, refrigerators, microwaves, toasters, crock-pots, and other devices and appliances.

The advertiser device(s) 108 may be any computing devices capable of receiving ad content (e.g., ad data and/or ad parameters) from users of the device(s) 108 (e.g., advertisers) and transmitting the content to the ad system 100. For example, the advertiser device(s) 108 may be any computing devices capable of receiving indications of sponsored proximate devices, sponsored proximate device types, and/or sponsored proximate device states from the users, as well as any of ad bid prices and additional parameters, and transmitting this information to the ad system 100. In some examples, the advertiser device(s) 108 may provide a GUI that enables the users of the device(s) 108 to specify the ad content and transmit the content to the ad system 100.

FIG. 2 illustrates an example of one of the user device(s) 102 and the advertiser device(s) 108 in communication with the ad system 100. FIG. 2 also illustrates an example of the proximate device(s) 104 that are located proximate to the user device 102. Specifically, FIG. 2 depicts example interactions and data exchanged among the proximate device(s) 104, user device 102, ad system 100, and advertiser device(s) 108. As shown in FIG. 2, the user device 102 may initially generate one or more ads. For example, the ads may include any of text and image (e.g., audiovisual) data describing advertised products, services, and/or businesses. The ads may also include one or more AMs, such as one or more AAMs and/or WAMs. The user device 102 may then identify one or more of the proximate device(s) 104. For example, the user device 102 may identify the proximate devices 104 using a proximate device identification module 126 included on the device 102. For instance, the proximate device identification module 126 may be configured to identify one or more of the proximate device(s) 104 that are located proximate to (e.g., nearby) the user device 102. In some examples, the proximate device identification module 126 may include a device determination module 128 configured to determine a model name, a model number, and/or a device ID of each of one or more of the identified proximate devices 104. In other examples, the user device 102 may further determine one or more types (e.g., categories) of the identified proximate devices 104 (e.g., via one or more type IDs associated with the types). For example, the proximate device identification module 126 may include a device type determination module 130 configured to determine the types of the identified proximate devices 104. Additionally, or alternatively, the user device 102 may determine one or more states of the identified proximate devices 104 (e.g., via one or more state IDs). For example, the proximate device identification module 126 may include a device state determination module 132 configured to determine the states.

As shown in FIG. 2, the user device 102 may transmit one or more indications of the ads generated by the device 102 to the ad system 100 (e.g., the ads themselves, or ad IDs that identify the ads in the ad data store 114). As also shown, the user device 102 may transmit one or more indications of the identified proximate devices 104, their types, and/or their states 116 to the ad system 100 (e.g., as the one or more device IDs, type IDs, and/or state IDs). In some examples, the user device 102 may transmit additional data to the ad system 100 (e.g., with the indications, or separately), including geo-location data, platform data, and/or other data (e.g., an IP address) associated with the user, the device 102, and/or the identified proximate devices 104.

In the example of FIG. 2, upon receiving the indications of the ads and the indications of the identified proximate devices 104, their types, and/or their states 116 from the user device 102, the ad system 100 may modify the ads to generate one or more modified ads 118 based on the indications. The ad system 100 may then transmit the modified ads 118 to the user device 102. As shown in FIG. 2, the modified ads 118 may include any of text and image (e.g., audiovisual) data describing advertised products, services, and/or businesses. For example, the modified ads 118 may include any information (e.g., text and/or image data, AAMs, and/or WAMs) in addition to, or in place of, any of the information included in the ads generated by the user device 102. Upon receiving the modified ads 118 from the ad system 100, the user device 102 may display the ads 118 to a user of the device 102 within a GUI 119. For example, the user device 102 may display the modified ads 118 (e.g., the GUI 119) within, or adjacent to (e.g., as an overlay with respect to) a state of a native app 115 (e.g., any of the native app(s) 124) or a web page in a web browser app (e.g., the web browser app 122) executing on the device 102. The user may view and/or interact with (e.g., touch, or click on) one or more of the modified ads 118 on the user device 102. Upon the user selecting any of the modified ads 118, the user device 102 may access the corresponding ad 118. In some examples, upon the user selecting the modified ad 118, the user device 102 may launch an app (e.g., one of the native app(s) 124 or the web browser app 122) and set the app into a state (e.g., a native app screen, or a web page) specified by an AAM or WAM associated with (e.g., included in) the selected ad 118. Examples of modified ads 118 displayed to a user of a user device 102 as part of, or adjacent to, a state of a native or web-based app are described with reference to FIGS. 6A-7C.

As shown in FIG. 2, the user device 102 may also include an OS 120 configured to perform any of the functions attributed to the device 102 herein. For example, the OS 120 may be configured to receive user inputs (e.g., user selections of modified ads 118) from users of the user device 102 and provide user outputs (e.g., display modified ads 118 and app states of native and/or web-based apps) to the users. The OS 120 may be further configured to enable the user device 102 to communicate with other systems or devices (e.g., transmit indications of ads and the proximate device(s) 104 to the ad system 100 and receive modified ads 118 from the system 100). As also shown, the user device 102 may include a web browser app 122 configured to access states of web-based apps (e.g., web pages, or web sites). As further shown, the user device 102 may include one or more native apps 124 that may execute on the user device 102.

FIG. 3A is a conceptual diagram that illustrates example interactions between the user device(s) 102, proximate device(s) 104, ad system 100, and advertiser device(s) 108. As described herein, the ad system 100 of FIG. 3A includes the ad modification module 110, ad record generation module 112, and ad data store 114. As shown in FIG. 3A, the user device(s) 102 may transmit one or more indications of ads (e.g., the ads themselves, or ad IDs that identify the ads in the ad data store 114) generated by the device(s) 102 to the ad modification module 110. As also shown, the user device(s) 102 may further transmit one or more indications of the proximate device(s) 104, their types, and/or their states 116 to the ad modification module 110. The ad modification module 110 may modify the ads to generate one or more modified ads 118 using the indications and information included in the ad data store 114, and transmit the ads 118 to the user device 102. For example, as described herein, the ad modification module 110 may generate the modified ads 118 using ad data 134 (e.g., ad content and/or ad parameters) included in one or more ad records stored in the ad data store 114. As also described herein, the ad modification module 110 may identify the ad records in the ad data store 114 using the indications of the proximate device(s) 104, their types, and/or their states 116. As also shown in FIG. 3A, one or more advertisers may communicate with the ad record generation module 112 via the advertiser device(s) 108 to provide the ad data 134 to the ad system 100. The ad record generation module 112 may generate one or more ad records that include the ad data 134 and store the records in the ad data store 114, as also described herein.

FIG. 3B is a functional block diagram of an example ad modification module 110. The ad modification module 110 of FIG. 3B includes an ad record identification module 136 configured to identify (e.g., perform searches for) one or more ad records included in the ad data store 114. For example, the ad record identification module 136 may identify the ad records based on (e.g., text) matches between indications of the proximate device(s) 104, their types, and/or their states 116 received from the user device(s) 102 and information (e.g., text) included in the records. In general, the ad record identification module 136 may identify the ad records based on matches between model names and/or numbers, device IDs, type IDs, and/or state IDs associated with the proximate device(s) 104, their types, and/or their states, as specified by the indication 116, and sponsored proximate device model names and/or numbers, device IDs, type IDs, and/or state IDs included in the identified records. As shown in FIG. 3B, in some examples, the ad modification module 110 may include ad logic 138 that enables the module 110 to identify one or more ad records included in the ad data store 114 using other techniques. For example, as also shown, the ad logic 138 may include a mapping module 140 configured to map indications of the proximate device(s) 104, their types, and/or their states 116 to one or more ad records included in the ad data store 114. In the example of FIG. 3B, the ad modification module 110 may identify one or more ad records included in the ad data store 114 using one or more indications of the proximate device(s) 104, their types, and/or their states 116 received from any of the user device(s) 102 as inputs to the mapping module 140. In some examples, the ad modification module 110 (e.g., the mapping module 140) may identify the ad records using mapping data 148 (e.g., a look up table, or another data structure) included in the ad data store 114, as described with reference to FIG. 3C. As further shown, the ad logic 138 may also include a mapping generation module 142 configured to generate the mapping data 148 and a mapping updating module 144 configured to update the data 148. The mapping data 148 may be generated and/or updated manually (e.g., via user inputs) and/or automatically (e.g., via historical user behavioral data and/or user ad selection data, as also described with reference to FIG. 3C).

In the example of FIG. 3B, the ad modification module 110 may also receive one or more indications of ads from the user device(s) 102, as described herein. In some examples, the indications of ads may include the ads themselves (e.g., text and/or image data, AAMs, and/or WAMs included in the ads). In these examples, upon receiving indications of ads, the ad modification module 110 may modify the ads using the identified ad records (e.g., the ad content included in the records). In other examples, the indications of ads may include one or more ad IDs that identify the ads in the ad data store 114. In these examples, the ad modification module 110 may identify the ads in the ad data store 114 using the ad IDs and modify the ads using the identified ad records (e.g., the ad content), as also described with reference to FIG. 3C.

FIG. 3C is a functional block diagram of an example ad data store 114. The ad data store 114 of FIG. 3C includes one or more ad records (e.g., ad records 400-1 . . . 400-N, where "N" is an integer value greater or equal to 1) that include information used to generate modified ads 118. Example ad records are described with reference to FIGS. 4A-4D. As shown in FIG. 3C, the ad data store 114 may also include ad logic data 146. As also shown, in some examples, the ad logic data 146 may include mapping data 148 that specifies a mapping between one or more indications of the proximate device(s) 104, their types, and/or their states 116 and one or more of the ad records included in the ad data store 114. In other examples, the ad logic data 146 may also include information used by the mapping generation module 142 and/or the mapping updating module 144 to generate and/or update the mapping data 148, as described herein. For example, as also shown, the ad logic data 146 may include historical user behavioral data 150 and/or user ad selection data 152 (e.g., upon the data 150, 152 becoming available to the ad system 100) that may be used to generate and/or update the mapping data 148.

In the example of FIG. 3C, the ad data store 114 may also include one or more ads (e.g., ads 300-1 . . . 300-N, where "N" is an integer value greater or equal to 1), as described with reference to FIG. 3B. The ads may include any of text and/or image data, AAMs, and/or WAMs. Each ad may be identified in the ad data store 114 using a corresponding ad ID. The ad modification module 110 may identify the ads in the ad data store 114 using ad IDs received from the user device(s) 102 and modify the ads using ad records (e.g., ad content included in the records) included in the data store 114, as also described with reference to FIG. 3B. In general, the ad data store 114 may include one or more databases, indices (e.g., inverted indices), files, or other data structures that may be used to implement the techniques of this disclosure.

FIGS. 4A-4D illustrate example ad records 400A-400D, respectively, that may be included in the ad data store 114. An ad record 400, as described herein, may include various different data used to generate a modified ad 118. For example, as shown in FIGS. 4A-4D, an ad record 400 may include data that identifies the record 400 among other ad records 400 included in the ad data store 114, such as an ad record name and/or identifier (ID) 402 (e.g., ad record names/IDs 402A-402D). As further shown, an ad record 400 may indicate a sponsored proximate device (e.g., via an ID 404A, such as a model name and/or a model number of the device), a sponsored proximate device type (e.g., a category) (e.g., via an ID 404B), or a sponsored proximate device (or, e.g., device type) state (e.g., via an ID 404C) associated with the record 400. A sponsored proximate device, its type, or its state indicated by an ad record 400 may specify one of the proximate device(s) 104, its type, or its state, respectively, for which an advertiser (e.g., via one of the advertiser device(s) 108) has paid to have an ad displayed to users of the user device(s) 102 modified in the manner described herein. For example, the advertiser may have paid to have the modified ad 118 generated and displayed to each user when the sponsored proximate device, any proximate device of the sponsored type, and/or a proximate device (or a proximate device of type) having the sponsored state is located proximate to (e.g., nearby) the corresponding one of the user device(s) 102.

As also shown in FIGS. 4A-4D, an ad record 400 may include ad content 406 (e.g., ad content 406A-406D) used to generate a modified ad 118 associated with the record 400. For example, the ad content 406 may include text, image, and/or other (e.g., audiovisual) data associated with the corresponding sponsored proximate device, type, and/or state and specified by an advertiser (e.g., via one of the advertiser device(s) 108) for generating the modified ad 118. As further shown, an ad record 400 may include one or more ad parameters 408 (e.g., ad parameters 408A-408D), which may define one or more budgets associated with generating the corresponding modified ad 118. The ad parameters 408 may also define timing parameters associated with generating the modified ad 118, such as start and stop dates and/or times of day during which the ad 118 is generated (e.g., an ad is modified). Additionally, the ad parameters 408 may specify user and/or platform parameters associated with generating the modified ad 118, such as one or more user, device, and/or platform (e.g., OS) types for which the ad 118 is generated. The ad system 100 (e.g., ad record identification module 136) may identify each of the example ad records 400A-400C of FIGS. 4A-4C based on one or more (e.g., text) matches between an indication of one of the proximate device(s) 104, its type, or its state 116 received from one of the user device(s) 102 and information (e.g., a sponsored proximate device, its type, or its state) included in the corresponding one of the records 400A-400C, as described herein. The ad system 100 (e.g., the mapping module 140) may identify the example ad record 400D of FIG. 4D using the indication 116 and mapping data 148 specifying a mapping between indications of the proximate device(s) 104, their types, and/or their states 116 and the ad records 400 included in the ad data store 114, as also described herein.

FIG. 5A is a flow diagram that illustrates an example method 500A for personalizing ads (i.e., generating modified ads 118) based on one or more of the proximate device(s) 104 using one of the user device(s) 102. In block 502A, the user device 102 (e.g., using the ad system 100) may initially generate an ad including text and/or image data (and, e.g., one or more AAMs and/or WAMs). In block 504A, the user device 102 may further identify one of the proximate device(s) 104 that is located proximate to (e.g., nearby) the device 102 using a local wireless network (e.g., Wi-Fi, Bluetooth, or NFC). In this example, the proximate device 104 may be configured to communicate via the local wireless network. Also in this example, to identify the proximate device 104, the user device 102 may receive an indication (e.g., a device ID) of the proximate device 104 from the proximate device 104 via the local wireless network. As described herein, the user device 102 may identify the proximate device 104 using the proximate device identification module 126 included on the device 102. Specifically, as one example, the user device 102 may determine a model name, a model number, and/or a device ID of the identified proximate device 104 using the device determination module 128 included in the proximate device identification module 126. As another example, the user device 102 may determine a type (e.g., a type ID) of the identified proximate device 104 using the device type determination module 130 also included in the proximate device identification module 126. As still another example, the user device 102 may determine a state (e.g., a state ID) of the identified proximate device 104 using the device state determination module 132 also included in the proximate device identification module 126. In some examples, the user device 102 may identify one or more additional ones of the proximate device(s) 104 in a similar manner.

In block 506A, in response to identifying the proximate device 104 (and, e.g., determining its category, or type, and/or its state), the user device 102 may modify the ad based on the device 104, its category, and/or its state. In block 508A, the user device 102 may display the modified ad 118 to a user of the device 102. For example, the user device 102 may display the modified ad 118 within, or adjacent to, an app state of a native or web-based app executing on the device 102. In some examples, the user device 102 may generate and display additional modified ads 118 in response to identifying additional ones of the proximate device(s) 104.

As shown in the example methods 500B-500C of FIGS. 5B-5C, respectively, in some cases, the user device 102 may perform various aspects of the ad personalization techniques described herein using the ad system 100. For example, the ad system 100 may initially generate the ad described with reference to the method 500A and transmit the ad to the user device 102. The ad system 100 may also store the ad in the ad data store 114. For example, with reference to FIG. 5B, in block 502B, the user device 102 may generate the ad (e.g., by receiving the ad from the ad system 100). In block 504B, the user device 102 may transmit a first indication of the ad to the ad system 100. For example, the first indication may identify the ad (e.g., using an ad ID), or include the ad (e.g., include the text and/or image data, AAMs, and/or WAMs included in the ad). Block 506B of the method 500B is analogous to block 504A of the method 500A. In block 508B, the user device 102 may transmit a second indication of the identified proximate device 104, its type, and/or its state 116 to the ad system 100. For example, the second indication 116 may include any of a device ID, a type ID, and a state ID associated with the identified proximate device 104, its type, and/or its state. As described with reference to FIG. 5C, the ad system 100 may receive the first indication and the second indication 116 from the user device 102, modify the ad to generate a modified ad 118 based on the received indications, and transmit the ad 118 to the device 102. Accordingly, in block 510B, the user device 102 may receive the modified ad 118 from the ad system 100 in response to transmitting the first and second indications. In block 512B, the user device 102 may display the modified ad 118 to the user.

With reference to FIG. 5C, in block 502C, the ad system 100 may initially receive the first indication of the ad from the user device 102. In block 504C, the ad system 100 may receive the second indication of the identified proximate device 104, its type, and/or its state 116 from the user device 102. In block 506C, the ad system 100 may generate the modified ad 118 based on the first indication and the second indication 116. For example, the ad system 100 may generate the modified ad 118 using the ad (e.g., included in the first indication, or retrieved from the ad data store 114 using the indication) and ad data 134 (e.g., ad content 406 and/or ad parameters 408) included in one or more ad records 400 stored in the data store 114. In block 508C, the ad system 100 may transmit the modified ad 118 to the user device 102. As described with reference to FIG. 5B, the user device 102 may receive the modified ad 118 from the ad system 100 and display the ad 118 to the user of the device 102.

FIGS. 6A-7C illustrate example GUIs that may be generated on one of the user device(s) 102 according to the present disclosure. Specifically, FIGS. 6A and 7A depict the user device 102 displaying a state 115 (e.g., a web page, or a screen) of a web browser app 122 or a native app 124, respectively, executing on the device 102. FIG. 6B depicts the user device 102 displaying an ad (e.g., as part of a GUI 119A) for GreenClean® cleaning services along with the state 115. In the example of FIG. 6B, the user device 102 may generate the ad (e.g., the GUI 119A) based on any number of considerations and data (e.g., based on information associated with a user of the device 102 and/or the device 102 itself, or based on one or more of the proximate device(s) 104). FIG. 6C depicts the user device 102 displaying a modified (e.g., personalized) version of the ad (e.g., a modified ad 118 shown as part of a GUI 119B) shown in FIG. 6B that references Tide® detergent. In the example of FIG. 6C, the user device 102 may modify the ad depicted in FIG. 6B upon identifying one of the proximate device(s) 104 that are located proximate to the user device 102, namely an Amazon® Dash Button® associated with Tide® detergent. Specifically, the user device 102 may select an ad (e.g., GUI) element including text and/or image data that references Tide® detergent, and include the element as part of (e.g., in a variable field of) the ad shown in FIG. 6B to generate the modified ad 118.

FIG. 7B depicts the user device 102 displaying a first modified version of an ad (e.g., a first modified ad 118 shown as part of a GUI 119C) that references Starbucks® coffee. In the example of FIG. 7B, the user device 102 may modify the ad upon identifying one of the proximate device(s) 104 located proximate to the user device 102, namely a home drip coffee maker. In particular, the user device 102 may select an ad element including text and/or image data that references the coffee maker, or its general type, and include the element as part of (e.g., in a variable field of) the ad shown in FIG. 7B to generate the first modified ad 118. FIG. 7C, in turn, depicts the user device 102 displaying a second, different modified version of the ad (e.g., a second modified ad 118 shown as part of a GUI 119D). In the example of FIG. 7C, the user device 102 may modify the ad upon identifying another one of the proximate device(s) 104 located proximate to the user device 102, namely a commercial coffee vending machine. As a result, the user device 102 may select an ad element including text and/or image data that references the vending machine, or its general type, and include the element as part of (e.g., in a variable field of) the ad shown in FIG. 7C to generate the second modified ad 118.

In still other examples, the user device 102 may identify the proximate device(s) 104 using any optical communication protocols, interfaces, and technologies, such as wireless infrared communications (e.g., IrDA) and laser-based communications (e.g., using a barcode scanner included in the user device 102 and barcodes present on the proximate device(s) 104). The user device 102 may then generate the modified ads 118 (e.g., via the ad system 100) and display the ads 118 to the user of the device 102. In further examples, the user device 102 may identify the proximate device(s) 104 using a current location of the device 102 (e.g., GPS coordinates associated with the device 102) and a database (e.g., a data store) including an indication of one or more proximate devices 104 and their corresponding geographic locations (e.g., GPS coordinates associated with the devices 104). The user device 102 may then generate the modified ads 118 (e.g., via the ad system 100) and display the ads 118 to the user.

In additional examples, the user device 102 may modify (e.g., personalize) the ads based on one or more (e.g., native and/or web-based) apps that are accessible by the user via the device 102. For example, the user device 102 may modify the ads based on one or more apps that are the most frequently used by the user on the device 102. In some examples, the user device 102 may modify a particular ad to include image, text, and/or other media that describe or reference an app that is accessible via the device 102 (e.g., a frequently used app). In other examples, the user device 102 may modify the ad to include image, text, and/or other media that describe or reference a theme associated with the app. As one example, upon determining that the user device 102 includes one or more apps by Rovio Entertainment Ltd. (e.g., that are frequently used), the device 102 may modify an ad to include a background picture of characters from the application "Angry Birds®" also by Rovio Entertainment Ltd. As another example, upon determining that the user device 102 includes one or more educational apps having an educational theme (e.g., that are frequently used), the device 102 may modify an ad to include a background picture of young children learning, which reflects the same educational theme.

The modules and data stores included in the ad system 100 represent features or functionality that may be included in the system 100 as it is described in the present disclosure. For example, the ad modification module 110, ad record generation module 112, ad data store 114, and the components thereof may represent features included in the ad system 100. The modules and data stores described herein may be embodied by electronic hardware, software, and/or firmware. Depiction of different features or functionality as separate modules or data stores does not necessarily imply whether the modules or data stores are embodied by common or separate electronic hardware, software, or firmware components. In some examples, the features or functionality associated with one or more of the modules and data stores may be realized by common or separate electronic hardware, software, or firmware components.

The modules and data stores may be embodied by electronic hardware, software, and/or firmware components including one or more processing units, memory components, input/output (I/O) components, and interconnect components. The interconnect components may be configured to provide communication between the processing units, memory components, and I/O components. For example, the interconnect components may include one or more buses configured to transfer data between electronic components. The interconnect components may also include one or more control circuits (e.g., a memory controller and/or an I/O controller) configured to control communication between electronic components.

The processing units may include one or more central processing units (CPUs), graphics processing units (GPUs), digital signal processing units (DSPs), application specific integrated circuits (ASICs), field programmable gate arrays (FPGAs), or other processing units. The processing units may be configured to communicate with the memory components and I/O components. For example, the processing units may be configured to communicate with the memory components and I/O components via the interconnect components.

A memory component, or memory, as described herein may include any volatile or non-volatile media. For example, a memory component may include electrical media, magnetic media, and/or optical media, such as any of random access memory (RAM), non-volatile RAM (NVRAM), read-only memory (ROM), electrically-erasable programmable ROM (EEPROM), Flash memory, solid state drives (SSDs), hard disk drives (HDDs), magnetic tape drives, optical storage technology (e.g., compact disc, digital versatile disc, and/or Blu-ray Disc), and any other equivalent or similar memory components, systems, or devices. The memory components may include (e.g., store) the various types of data described herein. For example, the memory components may store data included in one or more ad records 400 of the ad data store 114. The memory components may also include one or more instructions that may be executed by the processing units. For example, the memory components may include one or more computer-readable instructions that, when executed by the processing units, cause the units to perform the various functions attributed to the modules and data stores described herein.

The I/O components may refer to electronic hardware, software, and/or firmware that provide communication with various different devices. For example, the I/O components may provide communication between other devices and the processing units and memory components. In some examples, the I/O components may be configured to communicate with a computer network, such as the network 106. For example, the I/O components may be configured to exchange data over a computer network using any of a variety of different physical connections, wireless connections, and protocols. The I/O components may include one or more network interface components (e.g., a network interface controller), repeaters, network bridges, network switches, routers, and firewalls. In some examples, the I/O components may include hardware, software, and/or firmware configured to communicate with various human interface devices, including display screens, keyboards, pointer devices (e.g., a mouse), touchscreens, speakers, and microphones. In other examples, the I/O components may provide communication with additional devices, such as external memory (e.g., external HDDs).

In some examples, the ad system 100 may be a system of one or more computing devices (e.g., a computerized ad system) configured to implement the techniques described herein. In other words, the features or functionality attributed to the modules and data stores described herein may be implemented by one or more computing devices. Each computing device may include any combination of electronic hardware, software, and/or firmware, as described herein. Additionally, each computing device may include any combination of processing units, memory components, I/O components, and interconnect components, as also described herein. The computing devices of the ad system 100 may also include various human interface devices, including display screens, keyboards, pointing devices (e.g., a mouse), touchscreens, speakers, and microphones. The computing devices may also be configured to communicate with additional devices, such as external memory (e.g., external HDDs).

The computing devices of the ad system 100 may be configured to communicate with the network 106. The computing devices may also be configured to communicate with one another (e.g., within the ad system 100) via a computer network. In some examples, the computing devices may include one or more server computing devices configured to communicate with user devices, such as the user device(s) 102 or advertiser device(s) 108 (e.g., receive indications of ads, indications of the proximate device(s) 104, their types, and/or their states 116, ad data 134, and generate and transmit modified ads 118). The server computing devices may also gather data from various data sources, index the data, and store the data, as well as gather, index, and/or store other documents or information. The computing devices of the ad system 100 may reside within a single machine or within multiple machines at a single geographic location, or may be distributed across a number of geographic locations.

Additionally, the various implementations of the ad system 100 described herein (e.g., using one or more computing devices that include one or more processing units, memory components, I/O components, and interconnect components) are equally applicable to any of the user device(s) 102, proximate device(s) 104, and advertiser device(s) 108 described herein, as well as to the various components thereof.

What is claimed is:

1. A method comprising:
   receiving, by a user device, a plurality of advertisement (ad) templates from an ad system, wherein each ad template of the plurality of ad templates has one or more variable fields for text and image data;
   identifying, using the user device, a proximate device located proximate to the user device using a local wireless network, wherein the proximate device is configured to communicate via the local wireless network, and wherein identifying the proximate device comprises receiving an indication of the proximate device from the proximate device via the local wireless network;
   in response to identifying the proximate device, populating each ad template related to the identified proximate device, using the user device, based on the indication received from the identified proximate device, wherein populating a first ad template comprises:
   determining one or more of the following indications:
      a model name, a model number, and a device ID of the identified proximate device;
      a category of the identified proximate device;
      a state of the identified proximate device;
      a type of the identified proximate device; and
      an ownership indication associated with the identified proximate device;
   selecting, using the user device, one or more of a plurality of ad elements to include in variable fields of the first ad template, wherein the ad elements comprise at least one of the following:
      the model name of the identified proximate device;
      the model number of the identified proximate device;
      the device ID of the identified proximate device;
      the category of the identified proximate device;
      the state of the identified proximate device;
      the type of the identified proximate device; and
      the ownership indication associated with the identified proximate device; and
   including selected one or more of the plurality of ad elements in the variable fields of the first ad template to produce a modified ad;
   generating a score for each modified ad based on the indication received from the identified proximate device;
   selecting the modified ad associated with the highest score; and
   displaying the selected modified ad to a user at the user device,
   wherein the selected modified ad includes at least one of: a native application access mechanism (AAM) and a web access mechanism (WAM).

2. The method of claim 1,
   wherein the user device and the proximate device are communicatively coupled via the local wireless network, and
   wherein receiving the indication of the proximate device from the proximate device via the local wireless network comprises receiving the indication as part of the proximate device communicating with the user device.

3. The method of claim 1,
   wherein the proximate device is connected to the local wireless network, and
   wherein receiving the indication of the proximate device from the proximate device via the local wireless network comprises receiving the indication in response to the user device performing a scan for computing devices that are connected to the local wireless network.

4. The method of claim 1, wherein receiving the indication of the proximate device from the proximate device via the local wireless network comprises receiving the indication in response to the user device pinging the proximate device via the local wireless network.

5. The method of claim 1, wherein the proximate device and another computing device are communicatively coupled via the local wireless network, and wherein receiving the indication of the proximate device from the proximate device via the local wireless network comprises receiving the indication as part of the proximate device communicating with the other computing device.

6. The method of claim 1, further comprising:
   identifying an ad record included in an ad data store based on one or more matches between the determined indications and information included in the ad record;
   selecting ad content from the identified ad record; and
   generating a modified ad based on the selected ad content.

7. The method of claim 1, further comprising:
   identifying an ad record included in an ad data store based on the determined indications and based on a mapping between at least one of a device ID, a device category, and a device state and one or more ad records included in the ad data store;
   selecting ad content from the identified ad record; and
   generating a modified ad based on the selected ad content.

8. The method of claim 7, further comprising receiving, at the user device, an indication that the user has selected the modified ad on the user device, and updating, using the user device, the mapping based on the received indication.

9. The method of claim 1, wherein determining the ownership indication associated with the identified proximate device comprises determining one or more of the following:
   whether the user has indicated ownership of the identified proximate device via a user input on the user device;
   whether the user has previously interacted with the identified proximate device via the user device;
   how frequently the user has previously interacted with the identified proximate device via the user device;
   whether the user device has been previously located proximate to the identified proximate device;
   how frequently the user device has been previously located proximate to the identified proximate device; and whether the user is associated with one or more other devices that are similar to the identified proximate device.

10. The method of claim 1, wherein the local wireless network comprises a Wi-Fi network.

11. The method of claim 1, wherein the local wireless network comprises a Bluetooth network.

12. The method of claim 1, wherein the local wireless network comprises a near-field communications (NFC) network.

13. A user device comprising:
a network interface component configured to communicate with a local wireless network;
a display device;
one or more memory components configured to store computer-readable instructions; and
one or more processing units configured to execute the computer-readable instructions, wherein the computer-readable instructions, when executed by the one or more processing units, cause the one or more processing units to:
receive a plurality of advertisement (ad) templates from an ad system, wherein each ad template of the plurality of ad templates has one or more variable fields for text and image data;
receive an indication of a proximate device located proximate to the user device via the local wireless network using the network interface component, wherein the proximate device is configured to communicate via the local wireless network;
identify the proximate device based on the received indication;
in response to identifying the proximate device, populate the ad template related to the identified proximate device based on the indication received from the identified proximate device, wherein populating a first ad template includes:
determining one or more of the following indications:
a model name, a model number, and a device ID of the identified proximate device;
a category of the identified proximate device;
a state of the identified proximate device;
a type of the identified proximate device; and
an ownership indication associated with the identified proximate device;
selecting one or more of a plurality of ad elements to include in variable fields of the first ad template, wherein the ad elements comprise at least one of the following:
the model name of the identified proximate device;
the model number of the identified proximate device;
the device ID of the identified proximate device;
the category of the identified proximate device;
the state of the identified proximate device;
the type of the identified proximate device; and
the ownership indication associated with the identified proximate device; and
including the selected one or more of the plurality of ad elements in variable fields of the first ad template to produce a modified ad;
generate a score for each modified ad based on the indication received from the identified proximate devices;
select the modified ad associated with the highest score; and
display the modified ad to a user using the display device,
wherein the selected modified ad includes at least one of: a native application access mechanism (AAM) and a web access mechanism (WAM).

14. The user device of claim 13,
wherein the user device and the proximate device are communicatively coupled via the local wireless network, and
wherein receiving the indication of the proximate device from the proximate device via the local wireless network comprises receiving the indication as part of the proximate device communicating with the user device.

15. The user device of claim 13,
wherein the proximate device is connected to the local wireless network, and
wherein receiving the indication of the proximate device from the proximate device via the local wireless network comprises receiving the indication in response to the user device performing a scan for computing devices that are connected to the local wireless network.

16. The user device of claim 13, wherein receiving the indication of the proximate device from the proximate device via the local wireless network comprises receiving the indication in response to the user device pinging the proximate device via the local wireless network.

17. The user device of claim 13,
wherein the proximate device and another computing device are communicatively coupled via the local wireless network, and
wherein receiving the indication of the proximate device from the proximate device via the local wireless network comprises receiving the indication as part of the proximate device communicating with the other computing device.

18. The user device of claim 13, wherein the computer-readable instructions further cause the one or more processing units to:
identify an ad record included in an ad data store based on one or more matches between the determined indications and information included in the ad record;
select ad content from the identified ad record; and
generate a modified ad based on the selected ad content.

19. The user device of claim 13, wherein the computer-readable instructions further cause the one or more processing units to:
identify an ad record included in an ad data store based on the determined indications and based on a mapping between at least one of a device ID, a device category, and a device state and one or more ad records included in the ad data store;
select ad content from the identified ad record; and
generate a modified ad based on the selected ad content.

20. The user device of claim 13, wherein the computer-readable instructions further cause the one or more processing units to:
receive, at the user device, an indication that the user has selected the modified ad on the user device, and updating, using the user device, the mapping based on the received indication.

* * * * *